US011091330B2

(12) United States Patent
Yohe et al.

(10) Patent No.: US 11,091,330 B2
(45) Date of Patent: Aug. 17, 2021

(54) APPARATUS AND METHOD FOR DEPALLETIZING A LOADED PALLET

(71) Applicant: DYCO, INC., Bloomsburg, PA (US)

(72) Inventors: Peter D. Yohe, Bloomsburg, PA (US); Ronald H. Cordingly, Berwick, PA (US); John D. Sheehe, Bloomsburg, PA (US); Glenn W. Monroe, Berwick, PA (US)

(73) Assignee: Dyco, Inc., Bloomsburg, PA (US)

( * ) Notice: Subject to any disclaimer, the term of this patent is extended or adjusted under 35 U.S.C. 154(b) by 0 days.

(21) Appl. No.: 16/720,786

(22) Filed: Dec. 19, 2019

(65) Prior Publication Data

US 2021/0188571 A1 Jun. 24, 2021

(51) Int. Cl.
*B65G 59/02* (2006.01)

(52) U.S. Cl.
CPC ........ *B65G 59/02* (2013.01); *B65G 2814/031* (2013.01)

(58) Field of Classification Search
CPC ...... B65G 59/02; B65G 59/00; B65G 59/026; B65G 61/00; B65G 2814/00; B65G 2814/031; B65G 2814/0308; B65G 2814/027
See application file for complete search history.

(56) References Cited

U.S. PATENT DOCUMENTS

| | | | | | |
|---|---|---|---|---|---|
| 3,543,949 | A | * | 12/1970 | Weier | B65G 59/005 414/796.8 |
| 3,974,922 | A | * | 8/1976 | Selusnik | B65G 59/026 414/796.8 |
| 4,172,686 | A | * | 10/1979 | Shorthouse | B65G 59/026 198/719 |
| 4,988,264 | A | * | 1/1991 | Winski | B65G 59/005 108/51.3 |
| 2015/0078877 | A1 | * | 3/2015 | Brandmuller | B65G 59/026 414/796.2 |
| 2019/0077614 | A1 | * | 3/2019 | Tommesani | B65G 61/00 |

* cited by examiner

*Primary Examiner* — Lynn E Schwenning

(74) *Attorney, Agent, or Firm* — McNees Wallace & Nurick LLC

(57) ABSTRACT

An apparatus for depalletizing a loaded pallet comprised of (n) vertically stacked article arrays, each article array separated from an adjacent article array by a dunnage layer, the loaded pallet including a top article array vertically supporting a top dunnage layer. The apparatus is adapted to remove all article arrays from the loaded pallet and to deposit all collected dunnage layers onto the empty pallet.

20 Claims, 20 Drawing Sheets

APPARATUS AND METHOD FOR DEPALLETIZING A LOADED PALLET

FIELD OF THE INVENTION

The present invention is directed to an apparatus and method for depalletizing article arrays or portions thereof from a pallet.

BACKGROUND OF THE INVENTION

In many instances, it may be desirable to transport large quantities of articles, such as empty articles, to a location for filling. To reduce the amount of handling required and/or to reduce the amount of shipping material consumed, the articles may be arranged in a tight grouping, or array, of articles. Each array of articles can form a layer of articles that can be stacked on a pallet having a footprint which can be accommodated by freight hauling compartments, e.g., for truck, rail, sea or air vessels. Adjacent vertically stacked empty article arrays are typically separated from each other by dunnage layers to form a loaded pallet.

However, prior to filling, the articles must be depalletized. Conventional depalletizing apparatus typically requires personnel to incrementally remove dunnage layers, which is inefficient and expensive, as well as potentially hazardous for the personnel, as access to the top article arrays and associated dunnage layers may require the personnel to be on a ladder or elevated platform.

There is a need for improved apparatus and methods for depalletizing article arrays that do not suffer from these shortcomings.

BRIEF DESCRIPTION OF THE INVENTION

In an embodiment, an apparatus for depalletizing a loaded pallet comprised of (n) vertically stacked article arrays, each article array separated from an adjacent article array by a dunnage layer, the loaded pallet including a top article array vertically supporting a top dunnage layer, the apparatus includes a chamber for receiving the loaded pallet. The apparatus further includes an unloading zone, an aligner for aligning the top article array and the top dunnage layer with the unloading zone, a first remover for removing vertically exposed dunnage layers, and a collector for collecting the removed dunnage layers from the first remover. The apparatus further includes during operation of the apparatus, in response to the aligner aligning the top article array and the top dunnage layer with the unloading zone, the top dunnage layer is removed by the first remover, the collector then moving in the unloading zone or a second remover moving in or into the unloading zone to remove the top article array, vertically exposing a next top dunnage layer, the top dunnage layer being collected in the collector in the unloading zone. The apparatus further includes in response to the aligner aligning the next top article array and the next top dunnage layer with the unloading zone, the next top dunnage layer is removed by the first remover in the unloading zone, the collector then moving in the unloading zone or the second remover moving in or into the unloading zone to remove the next top article array, the next top dunnage layer being collected in the collector. The apparatus further includes in response to any remaining article arrays and dunnage layers being sequentially removed from the unloading zone by at least one of the first remover, the second remover or the collector, leaving an empty pallet, the collector is adapted to deposit all collected dunnage layers onto the empty pallet.

In another embodiment, an apparatus for depalletizing a loaded pallet comprised of (n) vertically stacked article arrays, each article array separated from an adjacent article array by a dunnage layer, the loaded pallet including a top article array vertically supporting a top dunnage layer, the apparatus includes a chamber for receiving the loaded pallet. The apparatus further includes an unloading zone, an aligner for aligning the top article array and the top dunnage layer with the unloading zone, a first remover for removing vertically exposed dunnage layers, and a collector for collecting the removed dunnage layers from the first remover. The apparatus further includes during operation of the apparatus, in response to the aligner aligning the top article array and the top dunnage layer with the unloading zone, the top dunnage layer is removed by the first remover, the collector then moving in the unloading zone or a second remover moving in or into the unloading zone to remove the top article array, vertically exposing a next top dunnage layer, the top dunnage layer being collected in the collector in the unloading zone. The apparatus further includes in response to the aligner aligning the next top article array and the next top dunnage layer with the unloading zone, the next top dunnage layer is removed by the first remover in the unloading zone, the collector then moving in the unloading zone or the second remover moving in or into the unloading zone to remove the next top article array, the next top dunnage layer being collected in the collector. The apparatus further includes in response to any remaining article arrays and dunnage layers being sequentially removed from the unloading zone by at least one of the first remover, the second remover or the collector, leaving an empty pallet, the collector is adapted to deposit all collected dunnage layers onto the empty pallet. The apparatus further includes the collector including an enclosure for stabilizingly supporting the article arrays while the arrays are being removed from the unloading zone in the first direction. The apparatus further includes the enclosure including a portion movable between a closed position for stabilizingly supporting the article arrays, and an open position for permitting the article arrays to be removed from the enclosure in the first direction.

In a further embodiment, a method of depalletizing a loaded pallet with a depalletizing apparatus, the loaded pallet including (n) vertically stacked article arrays, each article array separated from an adjacent article array by a dunnage layer, the loaded pallet including a top article array vertically supporting a top dunnage layer, the method includes (a) loading the loaded pallet into a chamber of the depalletizing apparatus, and (b) aligning the top article array and the top dunnage layer with an unloading zone of the depalletizing apparatus. The method further includes (c) removing the top dunnage layer with the depalletizing apparatus, vertically exposing the top article array, and (d) removing the top article array with the depalletizing apparatus, vertically exposing a next top dunnage layer. The method further includes (e) aligning a next top article array and the next top dunnage layer with the unloading zone of the depalletizing apparatus, and (f) removing the next top dunnage layer, vertically exposing a next top remaining article array. The method further includes (g) removing the next remaining top article array, and (h) repeating steps (e)-(g) until all article arrays are removed, leaving an empty pallet. The method further includes (i) depositing the removed dunnage layers on the empty pallet.

3

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
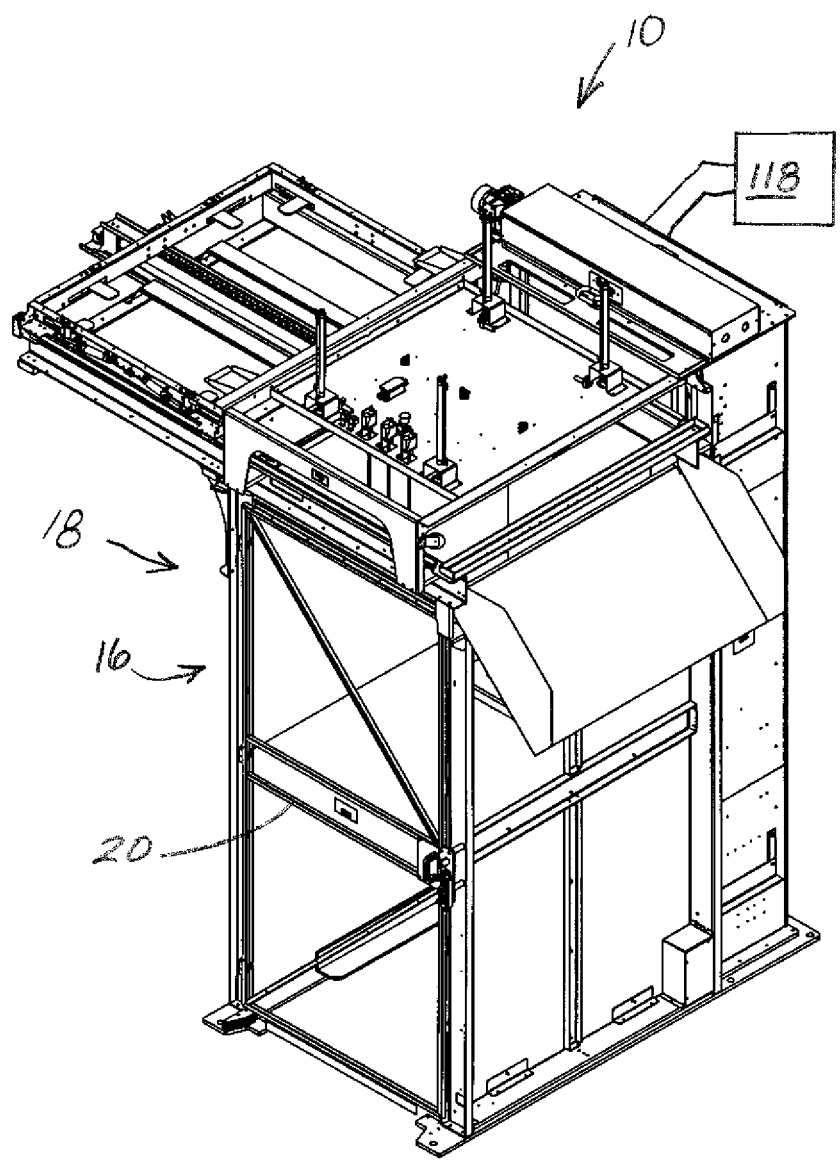
FIG. 1 is an upper perspective view of an exemplary depalletizing apparatus.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Figure 2:
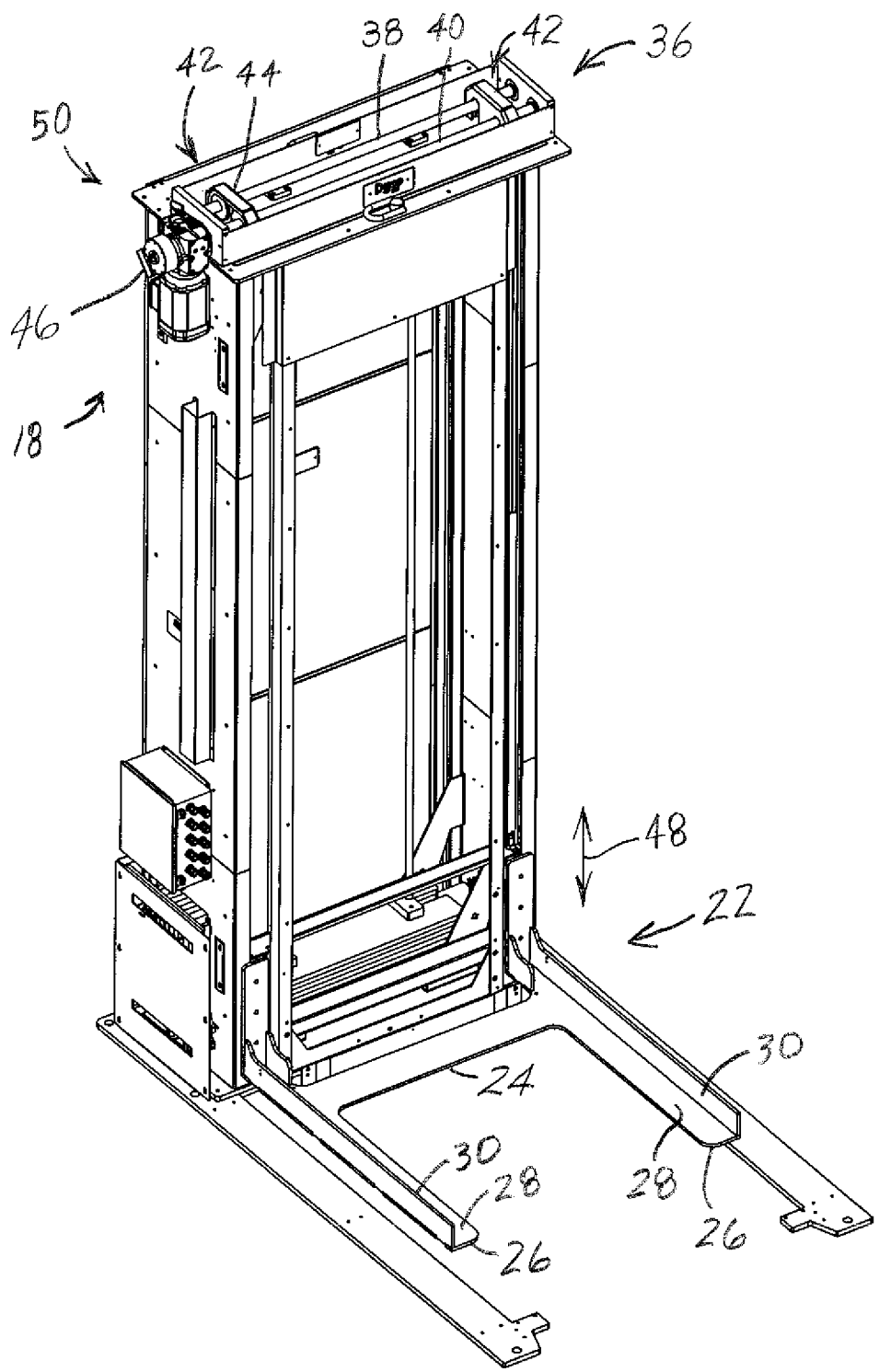
FIG. 2 is an upper perspective cutaway view of the depalletizing apparatus of FIG. 1 rotated 90 degrees counterclockwise about a vertical axis.
Figure 3A:
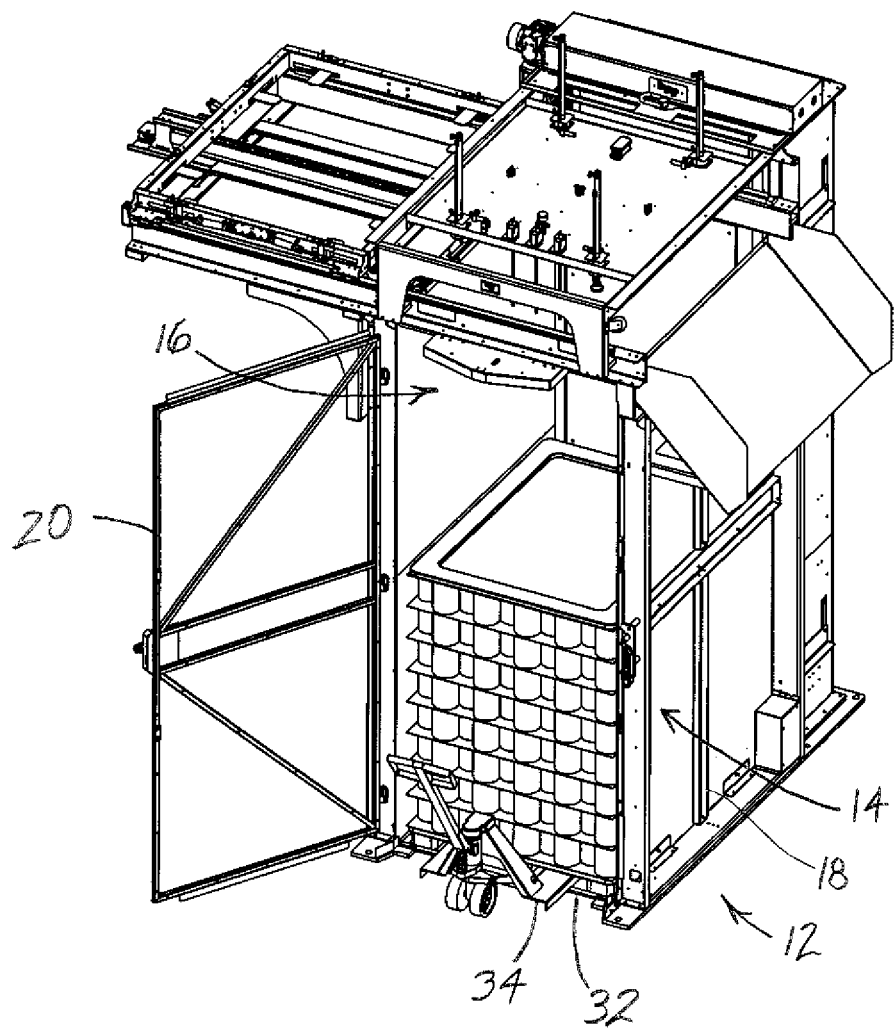
FIG. 3A is an upper perspective view of the depalletizing apparatus of FIG. 1 receiving a loaded pallet of article arrays.

Referring to FIG. 1, a depalletizing apparatus 10 for depalletizing article arrays 14 (FIG. 3A) from a loaded pallet 12 (FIG. 3A) is shown. Depalletizing apparatus 10 includes a chamber 16 bounded by a rectangular frame 18 including a door 20. In one embodiment, chamber 16 defines or includes interconnected or continuous walls or surfaces for separating and preventing inadvertent damage or harm as a result from contacting components moving inside of chamber 16 during operation of apparatus 10. As shown in FIG. 2, the apparatus includes a pallet lifting arrangement or lifter 22 that is movable relative to frame 18. As shown in FIG. 2, lifter 22 has a pair of forks 26, each fork 26 including a horizontal surface 28 and a vertical surface 30 adapted to engage and/or secure corresponding surfaces of a pallet 32 (FIG. 3A) of loaded pallet 12 (FIG. 3A) inserted inside of chamber 16 (FIG. 3A) by a pallet delivery device such as a pallet truck 34 (FIG. 3A). Once loaded pallet 12 (FIG. 3A) is positioned inside of chamber 16 (FIG. 3A), door 20 may be closed, and apparatus 10 (FIG. 1) may be operated.

As further shown in FIG. 2, lifter 22 includes a lifting arrangement 36 including a pair of shafts 38, 40 rotatably secured at an upper end 50 of frame 18. A pair of pulleys 42 are secured to each shaft 38, 40 such as proximate opposite ends of shafts 38, 40, with each pair of pulleys 42 frictionally engaging a corresponding elongated member 44 that is secured to lifting member 24 (only one elongated member 44 is shown in FIG. 2). A motor 46 drivingly rotates shaft 40 and its corresponding pulleys 42 about the longitudinal axis of shaft 40 (shaft 38 and idler pulleys 42 are similarly urged into rotational movement about the longitudinal axis of shaft 38 as a result of frictionally engaging elongated members 44), and finally, elongated members 44 urge lifting member 24 into vertical movement 48. That is, in response to motor 46 rotating in one direction, lifting member 24 is urged to move toward upper end 50 of frame 18. In response to motor 46 rotating in the opposite direction, lifting member 24 is urged to move away from upper end 50 of frame 18.

Figure 3B:
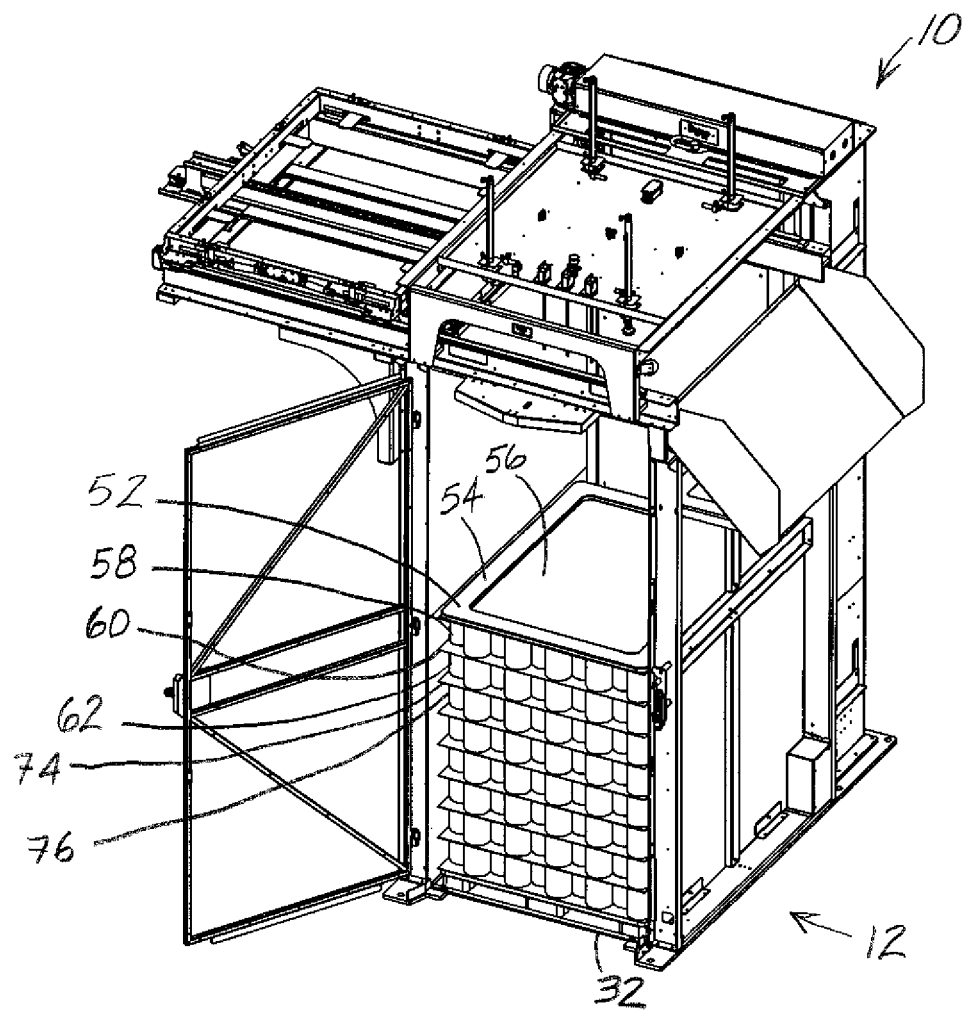
FIG. 3B is an upper perspective view of the depalletizing apparatus of FIG. 3A having received a loaded pallet of article arrays.

Referring to FIG. 3B, loaded pallet 12 includes a plurality of vertically stacked article arrays, each article array separated from an adjacent article array by a dunnage layer. For example, loaded pallet 12 includes a top dunnage layer 52 that may include both a top frame 54 and a top slip sheet 56 beneath top frame 54. A top article array 58 supports top dunnage layer 52. A next top dunnage layer 60 supports top article array 58, and a next top article array 62 supports next top dunnage layer 60. One having ordinary skill in the art understands that this sequential alternating support arrangement of remaining dunnage layers 74 and article arrays 76 continues to pallet 32. In other words, during operation of apparatus 10, as will be explained in further detail below, the vertically exposed dunnage layers/article arrays are sequentially removed one dunnage layer/article array at a time by the depalletizing apparatus.

For purposes herein, when the dunnage layers and article arrays are generally discussed, normally clarifying terms, e.g., "top," "next top" and the like may not be used.

For purposes herein, "vertically exposed" and the like are intended to refer to the currently top or vertically-most positioned dunnage layer/article array that is directly accessible from a position vertically above the corresponding topper vertically positioned dunnage layer/article array.

For purposes herein, including brevity and clarity of showing features in the embodiments associated with FIGS. 4-17 showing the operation of the depalletizing apparatus, it is to be understood that the article arrays and dunnage layers of the loaded pallet that are manipulated in FIGS. 4-17 are similar to those previously discussed in FIG. 3B, and therefore, the articles and article arrays may not be shown in FIGS. 4-17.

Figure 4:
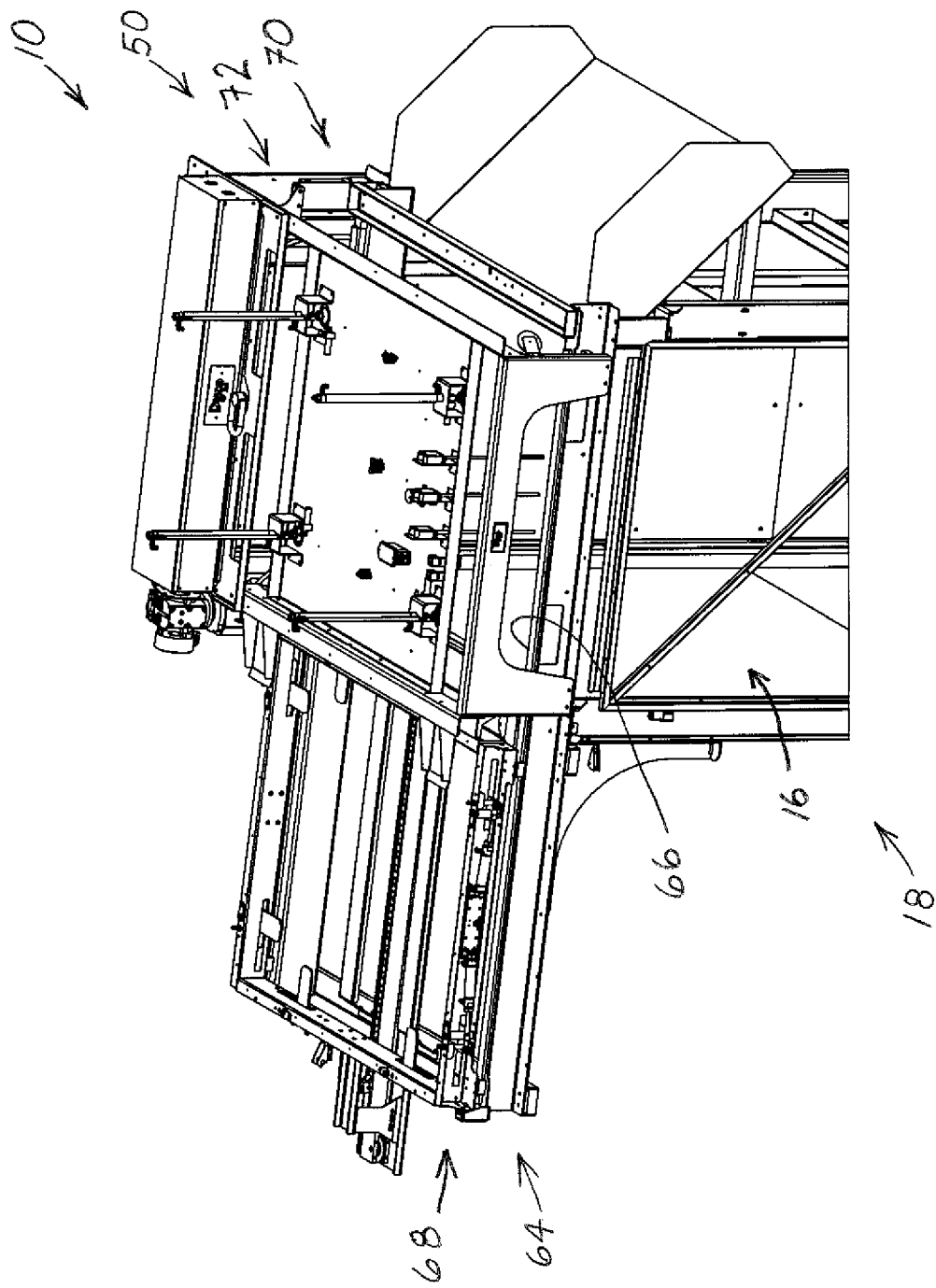
FIG. 4 is an enlarged, partial upper perspective view of the depalletizing apparatus of FIG. 1 rotated 90 degrees counterclockwise about a vertical axis.

Referring to FIG. 4, frame 18 of depalletizing apparatus 10 includes a frame portion 64 slidably supporting, such as by a rail 66, a collector 68 that is movable in and out of an unloading zone 70. A remover 72 is positioned vertically above chamber 16 and removes vertically exposed dunnage layers (e.g., dunnage layers 52, 60, 74 (FIG. 3B)) that are collected by a collector 68. Once the vertically exposed dunnage layer 52, 60, 74 (FIG. 3B) is collected by collector 68, the corresponding vertically exposed article array (e.g., 58, 62, 76 (FIG. 3B)) is removed from unloading zone 70, as will be discussed in additional detail below. The process is repeated until all of the article arrays have been removed, after which the collected dunnage layers 78 are deposited onto the empty pallet 32 (FIG. 16), and the resulting collected dunnage layers 78 and empty pallet 32 are lowered in chamber 16 for removal from the palletizing apparatus, in preparation of depalletizing the next loaded pallet.

Figure 5:
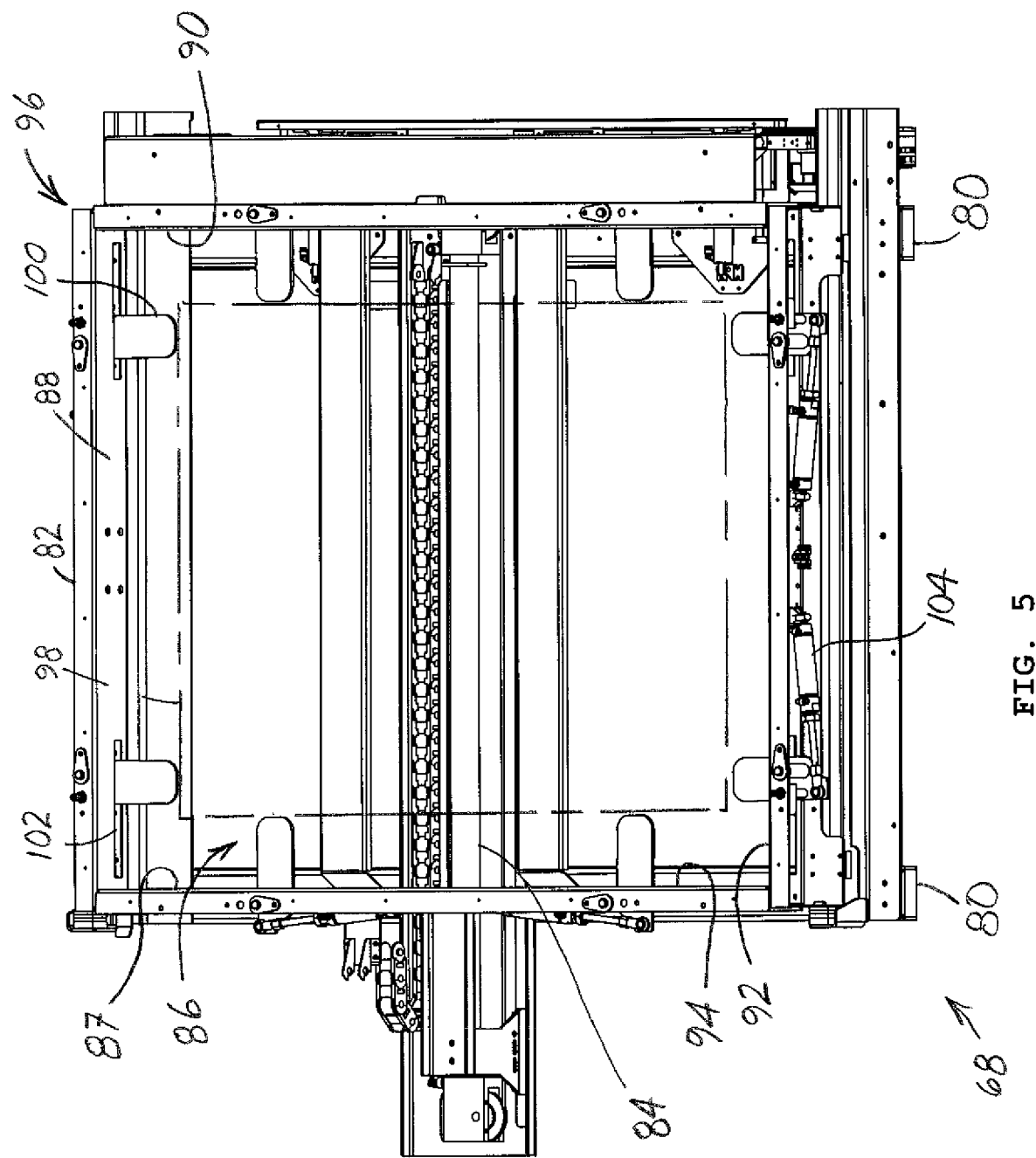
FIG. 5 is an enlarged, partial upper perspective view of an exemplary collector of the depalletizing apparatus of FIG. 4.

Referring to FIG. 5, collector 68 includes an open frame 82 having a plurality of fittings 80 adapted to engage rail 66 for slidable movement therealong both into and out of an unloading zone 70 (FIG. 4) as controlled by a movement source 84 such as a rodless cable cylinder such as manufactured by W. C. Brandham, Inc., located in River Falls, Wis. Frame 82 includes an inner periphery 87 defining a selectably adjustable aperture 86 between surfaces 88, 90, 92, 94 having an effective cross section 96 and an effective cross section 98 collectively defined by the periphery traced by the end(s) of at least one member 100 at least partially movable relative to inner periphery 87 for adjusting a size of aperture 86. As shown in FIG. 5, four pairs of members 100 are rotatable relative to a frame 82, each member 100 extending through a respective slot 102 and inside of a respective surface 88, 90, 92, 94 of aperture 86 by virtue of a mechanical pivoting linkage connected to and controlled by the length of a corresponding actuator 104. More specifically, when actuators 104 are fully extended as shown in FIG. 5, the ends of members 100 define effective cross section 98, and when actuators 104 are fully retracted, the ends of members 100 define effective cross section 96. Effective cross section 96 is sized to permit dunnage layers (e.g., dunnage layers 52, 60, 74 (FIG. 3B)) to fall through inner periphery 87 by force of gravity. Effective cross section 98 is sized to prevent dunnage layers from falling through the inner periphery 87 by force of gravity, as the dunnage layers are supported by members 100 or a combination of members 100 and one or more of associated surfaces 88, 90, 92, 94 of inner periphery 87.

Figure 6A:
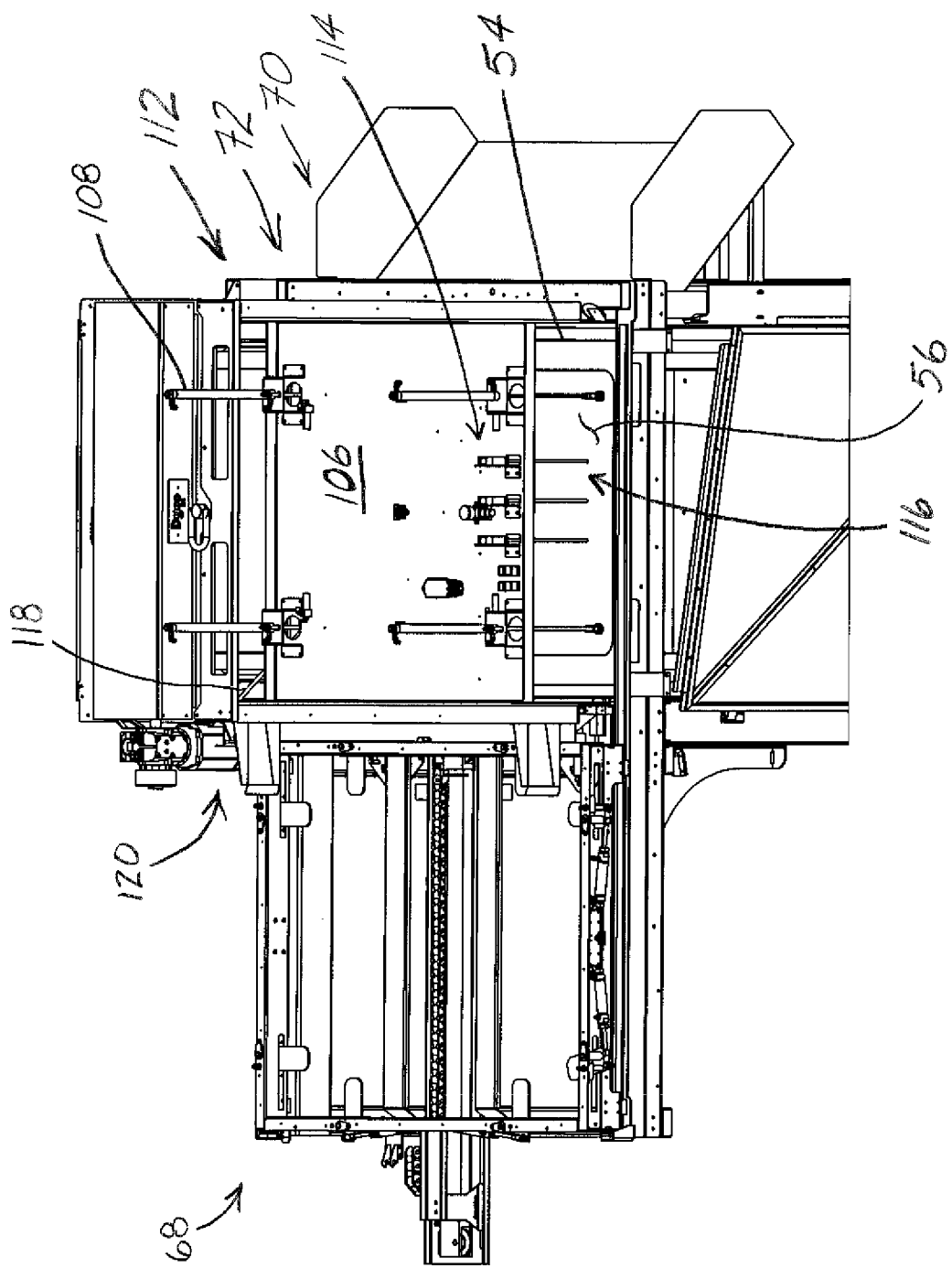
FIG. 6A is an enlarged, partial upper perspective view of the depalletizing apparatus of FIG. 4 engaging a dunnage layer.
Figure 6B:
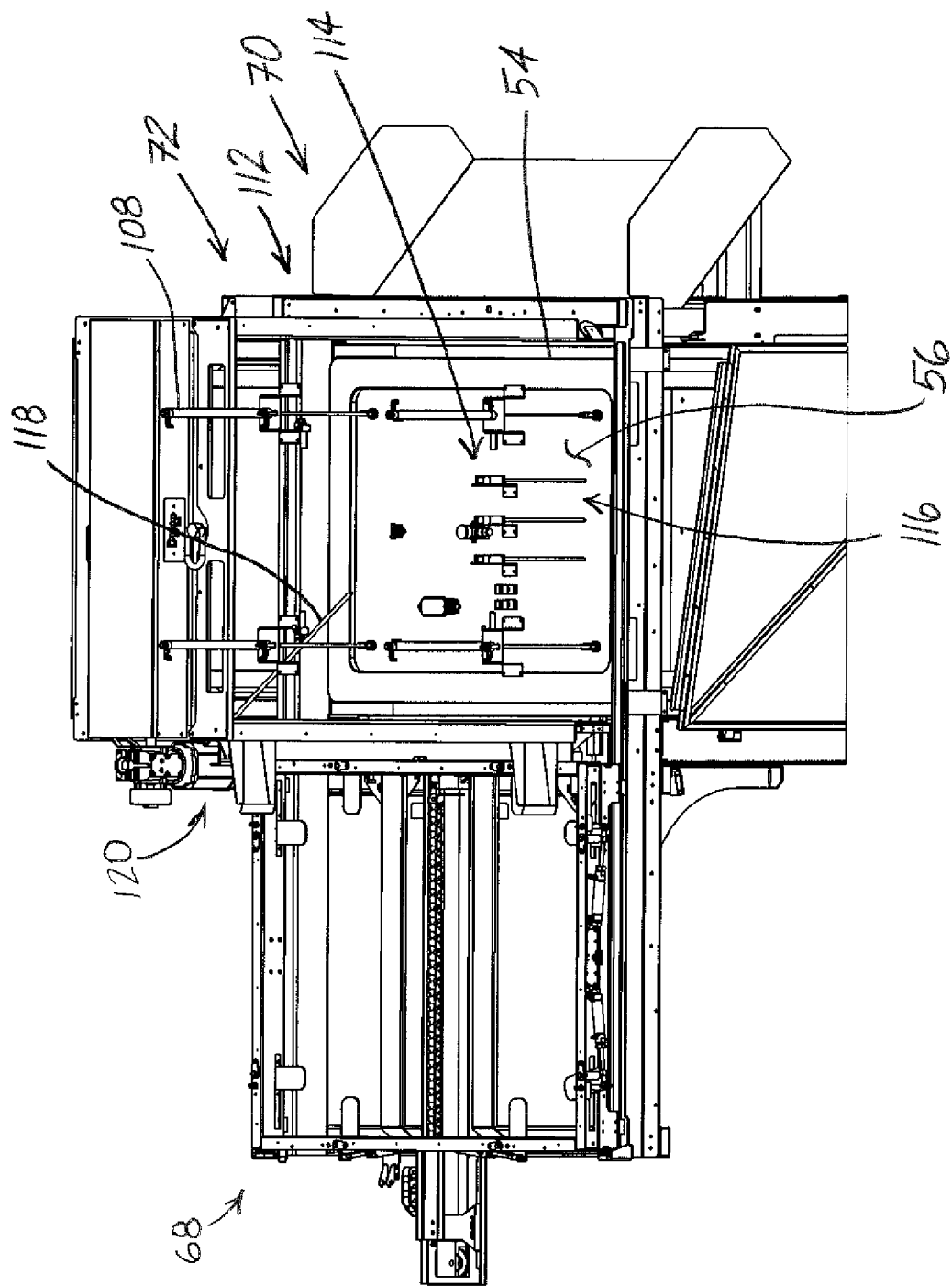
FIG. 6B is an enlarged, partial upper perspective cutaway view of the depalletizing apparatus of FIG. 6A engaging a dunnage layer.
Figure 7:
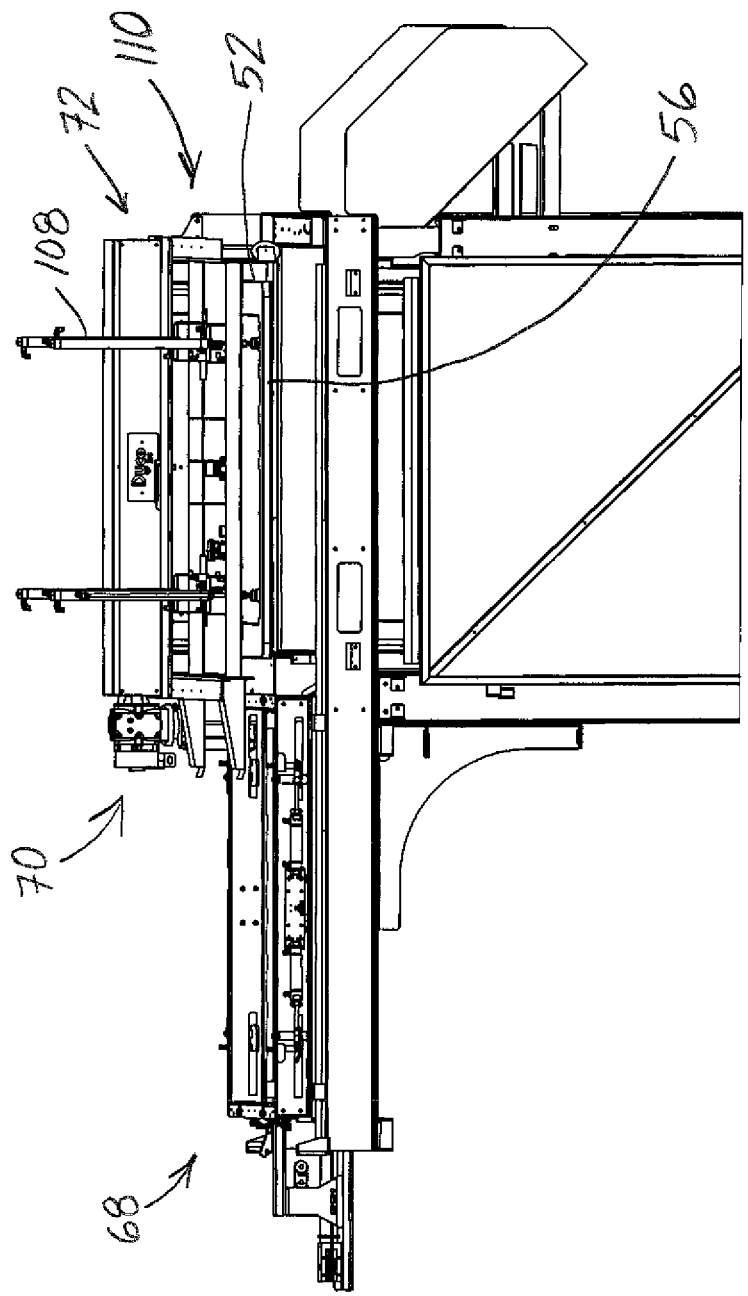
FIG. 7 is an enlarged, partial generally elevation view of the depalletizing apparatus of FIG. 6A.

Referring to FIGS. 6A and 6B, remover 72 is now discussed. FIG. 6B is a cutaway of FIG. 6A (e.g., support panel 106 is shown in FIG. 6A and removed from FIG. 6B) for purposes of clarity. Remover 72 includes one or more, such as four, pneumatic actuators 108 adapted to move between a retracted position 110 (FIG. 7) and an extended position 112 (FIGS. 6A and 6B) Pneumatic actuators 108 are connected to a pneumatic source (not shown) for drawing a vacuum sufficient to vertically lift dunnage layers, such as dunnage layers 54, 56 shown in FIGS. 6A, 6B, 7 when pneumatic actuators 108 are in retracted position 110 (FIG. 7).

Further referring to FIGS. 6A, 6B, a sensor 114 (three sensors shown in FIGS. 6A, 6B) such as a laser sensor emits a beam 116 for determining when top article array 58 (FIG. 3B) and top dunnage layer 52 (FIG. 3B) or remaining vertically exposed dunnage layers 60, 74 (FIG. 3B) and corresponding remaining vertically exposed article arrays 62, 76 (FIG. 3B) are aligned with each other in unloading zone 70 by lifter 22 (FIG. 2). For purposes herein, sensors are intended to include other types of devices, such as proximity switches that make physical contact with a predetermined surface such as a dunnage layer, or other suitable position-determining devices or sensors may be used to determine when the corresponding vertically exposed dunnage layers 52, 60, 74 (FIG. 3B) and article arrays 58, 60, 74 (FIG. 3B) are aligned in unloading zone 70 by lifter 22 (FIG. 2). Additional sensors may also be used to perform similar tasks, such as determining if pneumatic actuators 108 of remover 72 have properly engaged and raised or separated a corresponding dunnage layer from its supporting article array. For example, as shown in FIG. 7, beam 118 (FIGS. 6A, 6B) from sensor 120 (FIGS. 6A, 6B) may be used to determine that top frame 54 and top slip sheet 56 have been engaged and vertically raised by pneumatic actuators 108 relative to top article array 58 (FIG. 3B) when pneumatic actuators 108 are in retracted position 110.

It is to be understood that the operation and movement of associated components, including sensors, of the depalletizing apparatus is controlled by a microprocessor or control device or controller 118 (FIG. 1), operating in a known manner, and is driven by any appropriate drive mechanism known in the art, and not limited to those disclosed in the exemplary embodiments herein.

Figure 8:
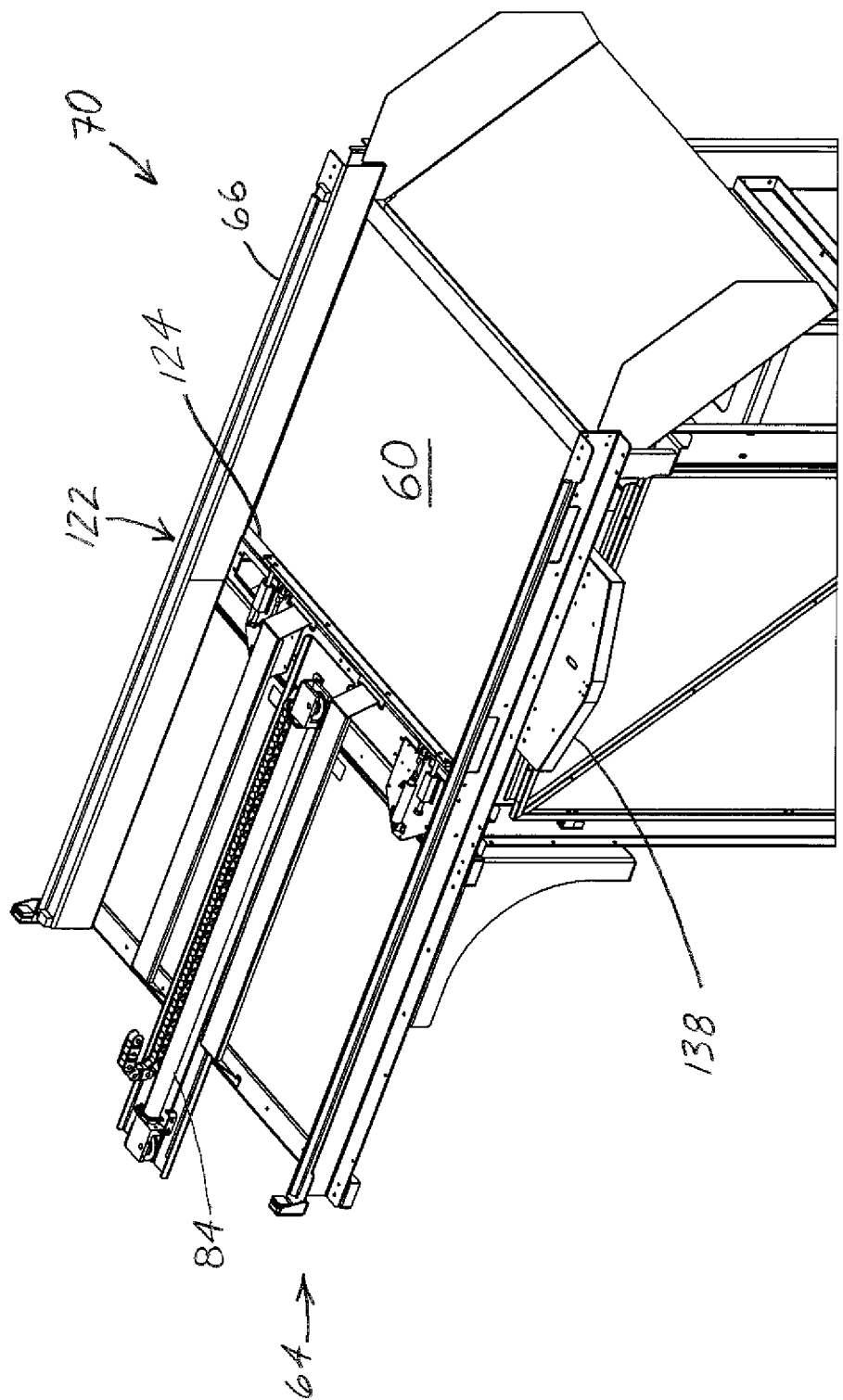
FIG. 8 is an enlarged, partial upper perspective cutaway view of an exemplary first positioner of the depalletizing apparatus of FIG. 4 positioning a dunnage layer in a first direction.
Figure 9:
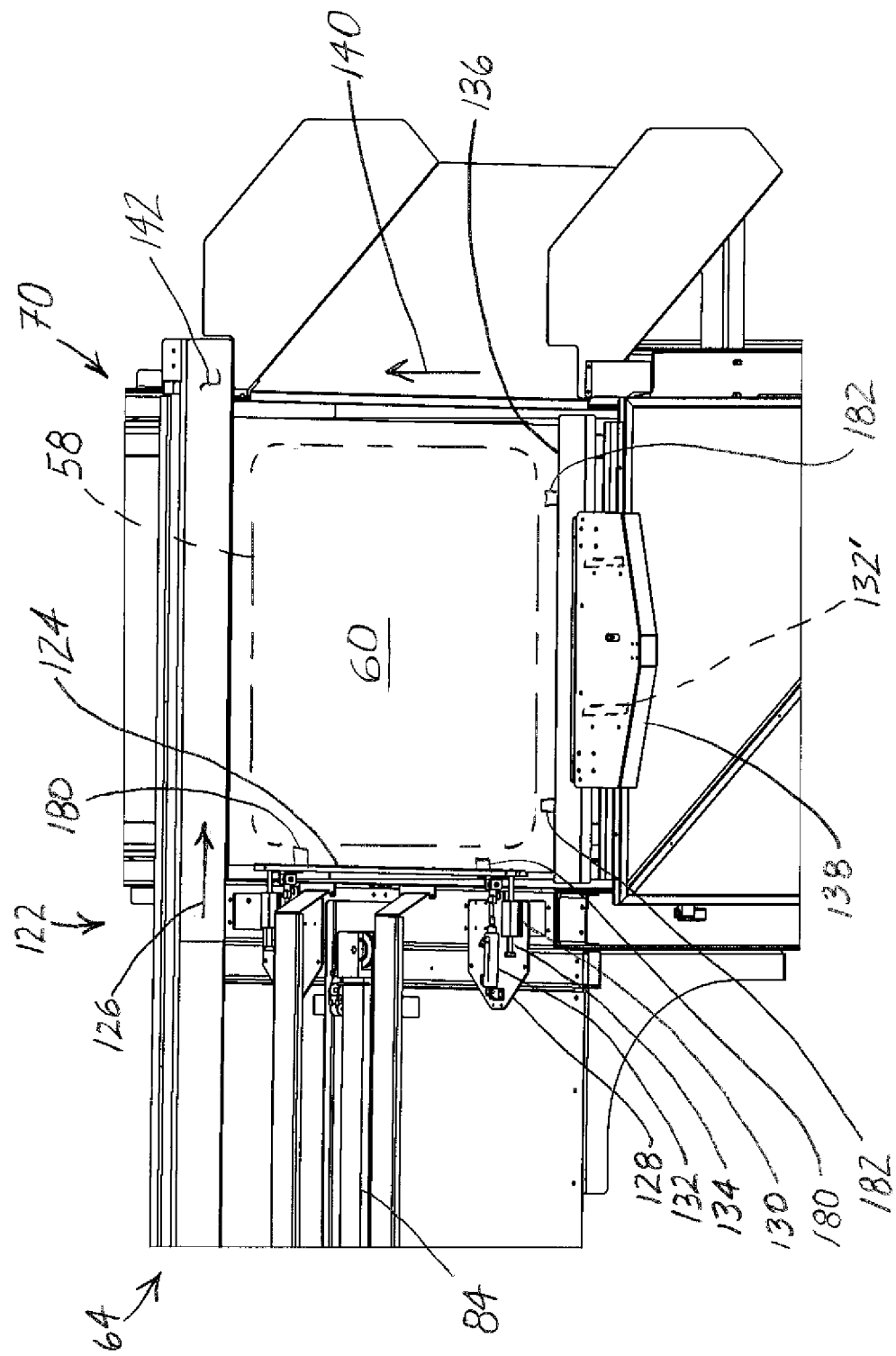
FIG. 9 is an enlarged, partial upper perspective cutaway view of an exemplary second positioner of the depalletizing apparatus of FIG. 4 further positioning the dunnage layer of FIG. 4 in a second direction.

Referring to FIGS. 8 and 9, once (or in response to) the top or vertically exposed dunnage layer 52, 60, 74 (FIG. 3B) and corresponding top or vertically exposed article array 58, 62, 76 (FIG. 3B) have been aligned in unloading zone 70 by aligner 114 (FIG. 6A, 6B), and the top or vertically exposed dunnage layer 52, 60, 74 (FIG. 3B) has been removed by remover 72 (FIG. 7), a retainer 122 includes a positioner 124 for retaining the corresponding remaining vertically exposed dunnage layer 60, 74 (FIG. 3B) in unloading zone 70. More specifically, as shown in FIG. 9, positioner 124 moves the corresponding remaining vertically exposed dunnage layer 60, 74 (FIG. 3B) a predetermined distance in unloading zone 70 in a direction 126 away from movement source 84.

In one embodiment, positioner 124 includes one or more grippers 180 for applying a gripping compressive force to opposed surfaces of the corresponding remaining vertically exposed dunnage layer 60, 74 (FIG. 3B) or a retention force, including a force directed into a surface (perpendicular or non-perpendicular) or away (perpendicular or non-perpendicular) from the surface (e.g., a vacuum force), applied to one surface of the corresponding remaining vertically exposed dunnage layer 60, 74 (FIG. 3B) for preventing the corresponding remaining vertically exposed dunnage layer 60, 74 (FIG. 3B) from shifting while the corresponding vertically exposed article array 62, 76 (FIG. 3B) is removed from unloading zone 70. For purposes of discussion, dunnage layer 60 is shown in FIG. 9. It is to also be understood that at this time, top article array 58 is being supported in unloading zone 70 by vertically exposed dunnage layer 60.

As shown in FIG. 9, retainer 122 includes a pair of plates 128 each secured to frame portion 64, and a block 130 secured to each plate 128. An actuator 132 such as a pneumatic actuator connected to a pressurized air source (not shown) is secured at one end to each plate 128, and to positioner 124 at the other end. A rod 134 is slidably received in each block 130, and secured to positioner 124 at one end. In response to actuators 132 being urged by the pressurized air source to an extended position, actuators 132 similarly urge positioner 124 in a direction 126, which positioner 124 being guided by rods 134 that are slidably received in corresponding blocks 130. As positioner 124 is urged into contact with an edge of dunnage layer 60, both dunnage layer 60 and article array 58 are urged to move in unison with positioner 124 and direction 126.

As further shown in FIG. 9, subsequent to positioner 124 urging dunnage layer 60 and article array 58 to move a predetermined distance in the direction 126, retainer 122 further includes a positioner 136 for fixedly positioning dunnage layer 60 in unloading zone 70. As shown in FIG. 9, an enclosure 138 is operatively connected to positioner 136, with enclosure 138 including an arrangement as previously discussed with regard to positioner 124 (e.g., plate 128, block 130, actuator 132, rod 134; however, only actuators 132' are inside of enclosure 138). In response to actuators 132' being urged by the pressurized air source to an extended position, actuators 132' similarly urge positioner 136 in a direction 140 that is different from, such as being perpendicular to direction 126, until positioner 136 and surface 142 of frame portion 64 apply a compressive force to opposed corresponding edges of dunnage layer 60 sufficient to at least temporarily immobilize or maintain in a fixed position dunnage layer 60 in unloading zone 70.

In one embodiment, positioner 136 includes one or more grippers 182 for applying a gripping compressive force to opposed surfaces of the corresponding remaining vertically exposed dunnage layer 60, 74 (FIG. 3B) or a retention force, including a force directed into a surface (perpendicular or non-perpendicular) or away (perpendicular or non-perpendicular) from the surface (e.g., a vacuum force), applied to one surface of the corresponding remaining vertically exposed dunnage layer 60, 74 (FIG. 3B) for preventing the corresponding remaining vertically exposed dunnage layer 60, 74 (FIG. 3B) from shifting while the corresponding vertically exposed article array 62, 76 (FIG. 3B) is removed from unloading zone 70. For purposes of discussion, dunnage layer 60 is shown in FIG. 9. It is to also be understood that at this time, top article array 58 is being supported in unloading zone 70 by vertically exposed dunnage layer 60.

Figure 10:
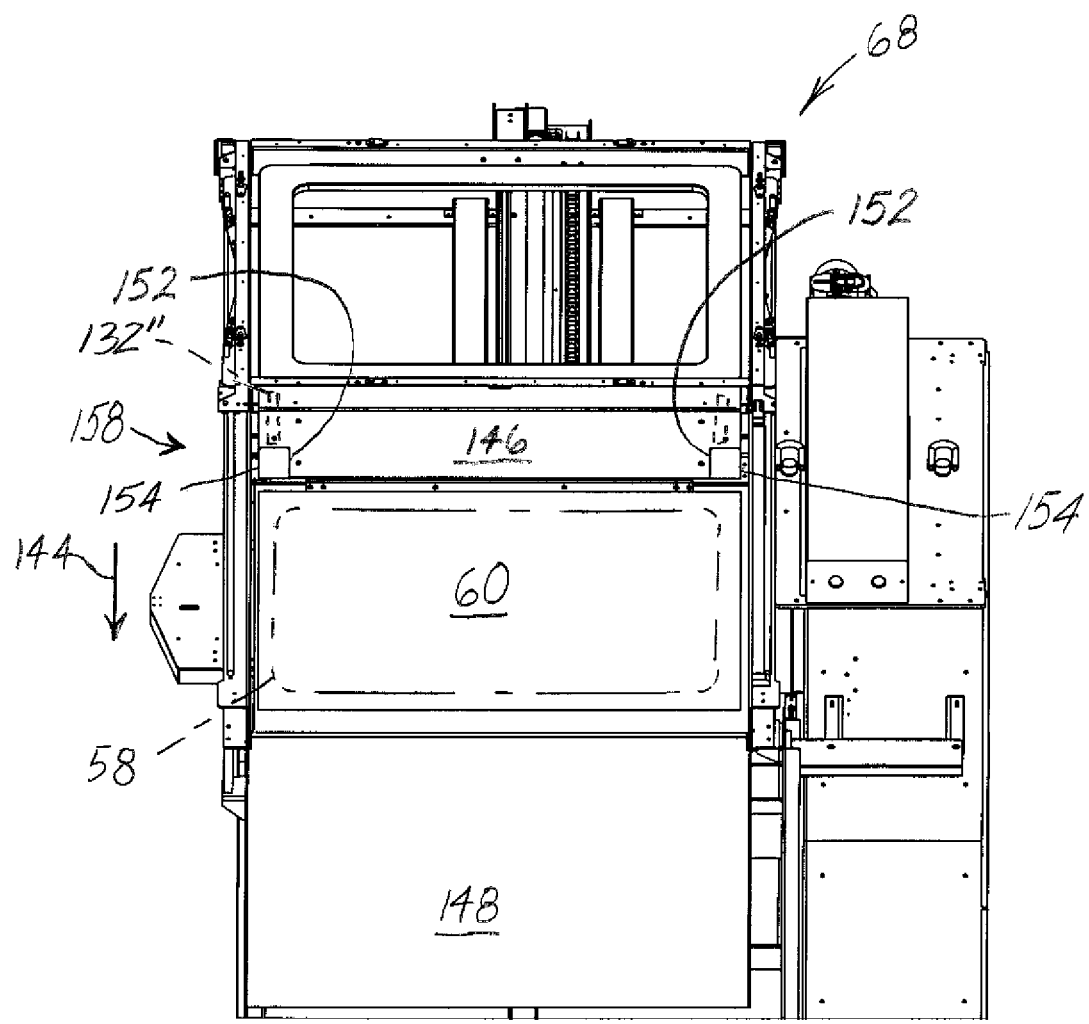
FIG. 10 is an upper perspective cutaway view of collector surface portions in a first position of the depalletizing apparatus of FIG. 4.
Figure 11:
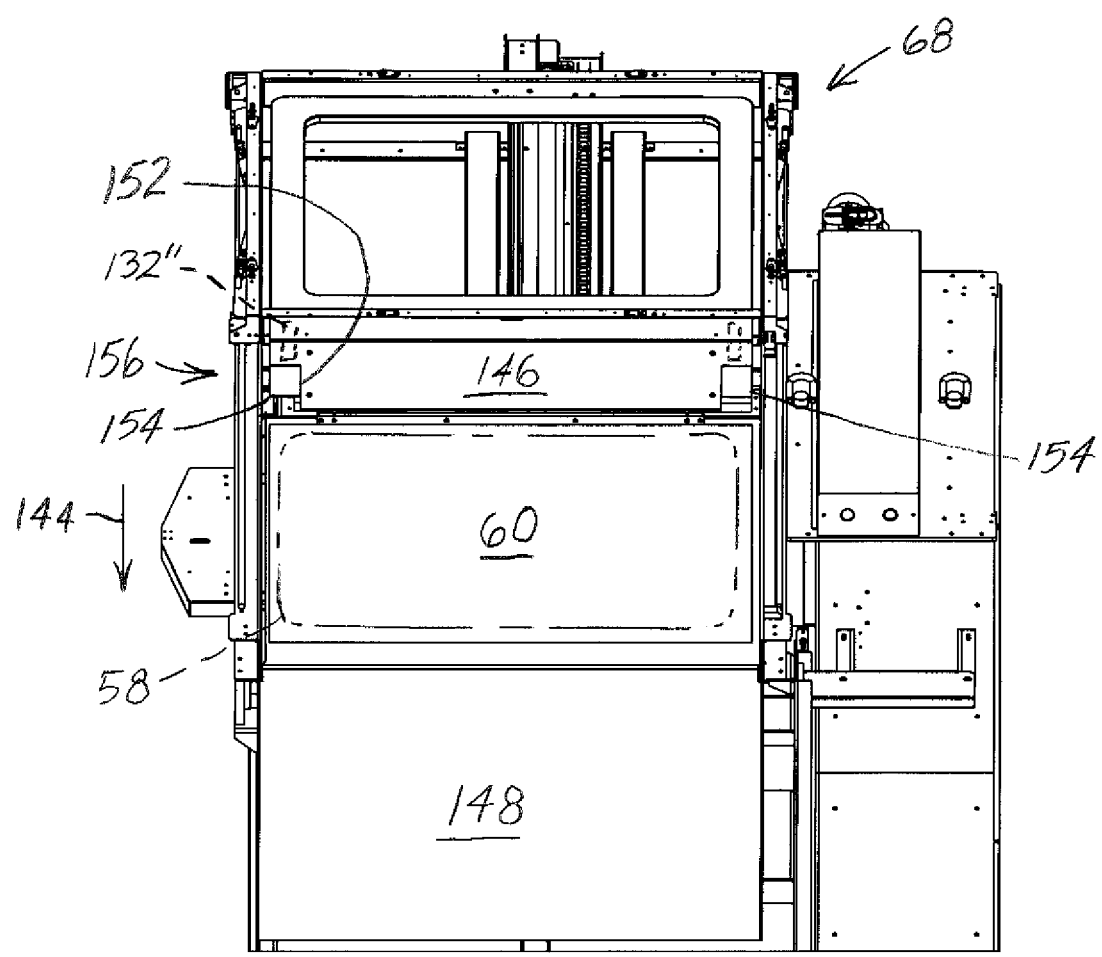
FIG. 11 is an upper perspective cutaway view of collector surface portions in a second position of the depalletizing apparatus of FIG. 4.

Referring to FIGS. 10-13, once dunnage layer 60, which supports top article array 58, has been immobilized or maintained in a fixed position in unloading zone 70, collector 68 is urged into movement relative to unloading zone 70 in direction 144 by movement source 84 (FIG. 12) for removing article array 58 from unloading zone 70. More specifically, as shown in FIGS. 10-11, collector 68 includes a surface 146 that is adapted to contact and "push" articles of top article array 58 positioned in unloading zone 70 out of unloading zone 70, as collector 68 is urged in direction 144 toward a chute 148. That is, articles of top article array 58 are pushed into chute 148, after which the "scrambled" articles are subsequently processed (e.g., empty articles are rearranged, filled, and re-palletized).

Further referring to FIGS. 10-13, prior to or simultaneously with collector 68 being urged in direction 144, movable surface portions 150 of surface 146 help maintain smooth operation of the depalletizing apparatus by preventing corresponding portions of surface 146 of collector 68 inadvertently engaging dunnage layer 60. More specifically, the corners of edge of dunnage layer 60 facing surface 146 of collector 68 may become dog-eared as a result of normal wear or rough handling, and be susceptible to inadvertently engage the bottom of surface 146 as surface 146 of collector 68 is moved in direction 144 over dunnage layer 60. As a result, opposed ends or portions 152, such as rectangular shaped portions, of surface 146 are removed, and replaced with movable surface portions 154 that are movable by an arrangement similar as previously discussed with regard to positioner 124 (FIG. 9) (e.g., plate 128, block 130, actuator 132, rod 134; however, only actuators 132" are shown behind surface 146 in FIGS. 10-11). In response to actuators 132" being urged by the pressurized air source to a retracted position, actuators 132" similarly urge or move surface portions 154 to an open position 156 (FIG. 11) such that surface portions 154 are at least partially, if not totally retracted behind surface 146, thereby preventing surface portions 154 from inadvertently engaging or "snagging" dunnage layer 60. In response to actuators 132" being urged by the pressurized air source to an extended position, actuators 132" similarly urge or move surface portions 154 toward or to a closed position 158 (FIG. 10) such that surface portions 154 are at least partially, if not fully extended from behind surface 146, resulting, in effect, of enlarging surface 146 to its full size (i.e., without removal of surface portions 152). As a general matter, surface portions 154 will not be moved to a closed position 158 (FIG. 10) or moved away from or sufficiently moved away from open position 156 (FIG. 11) until the risk of inadvertent engagement or "snagging" of dunnage layer 60 is minimized, such as by imposing a time delay as collector 68 is being moved in direction 144 into unloading zone 70 before the actuators 132" are responsive, or imposing a predetermined distance along direction 144 (FIG. 12), before actuators 132" are responsive, for example, corresponding to a minimum footprint dimension of an article from the article arrays.

Referring back to FIG. 12, the arrangement in which only surface 146 of collector 68 contacts and "pushes" articles of article array 58 positioned in unloading zone 70 out of unloading zone 70 as collector 68 is urged in direction 144 toward chute 148 does not stabilizingly support the articles of article array 58. That is, as articles of article array 58 are pushed into chute 148, the articles are not simultaneously peripherally supported, likely resulting in many of the articles "tipping" as the articles reach chute 148 in preparation of subsequent processing of the "scrambled" articles. However, the depalletizer of the present application is not so limited, and contemplates stabilizingly supporting the article arrays.

For purposes herein, "stabilizingly supporting" and variations thereof refer to support provided to at least the periphery of the article arrays such as to prevent tipping of the articles in the article arrays. For example, such stabilizing support may include, but is not limited to lateral support, including support forces directed substantially perpendicular to the support surfaces, such as, for example, discussed in additional detail in Applicant's application Ser. No. 16/449,892 that is incorporated herein by reference in its entirety.

Figure 12:
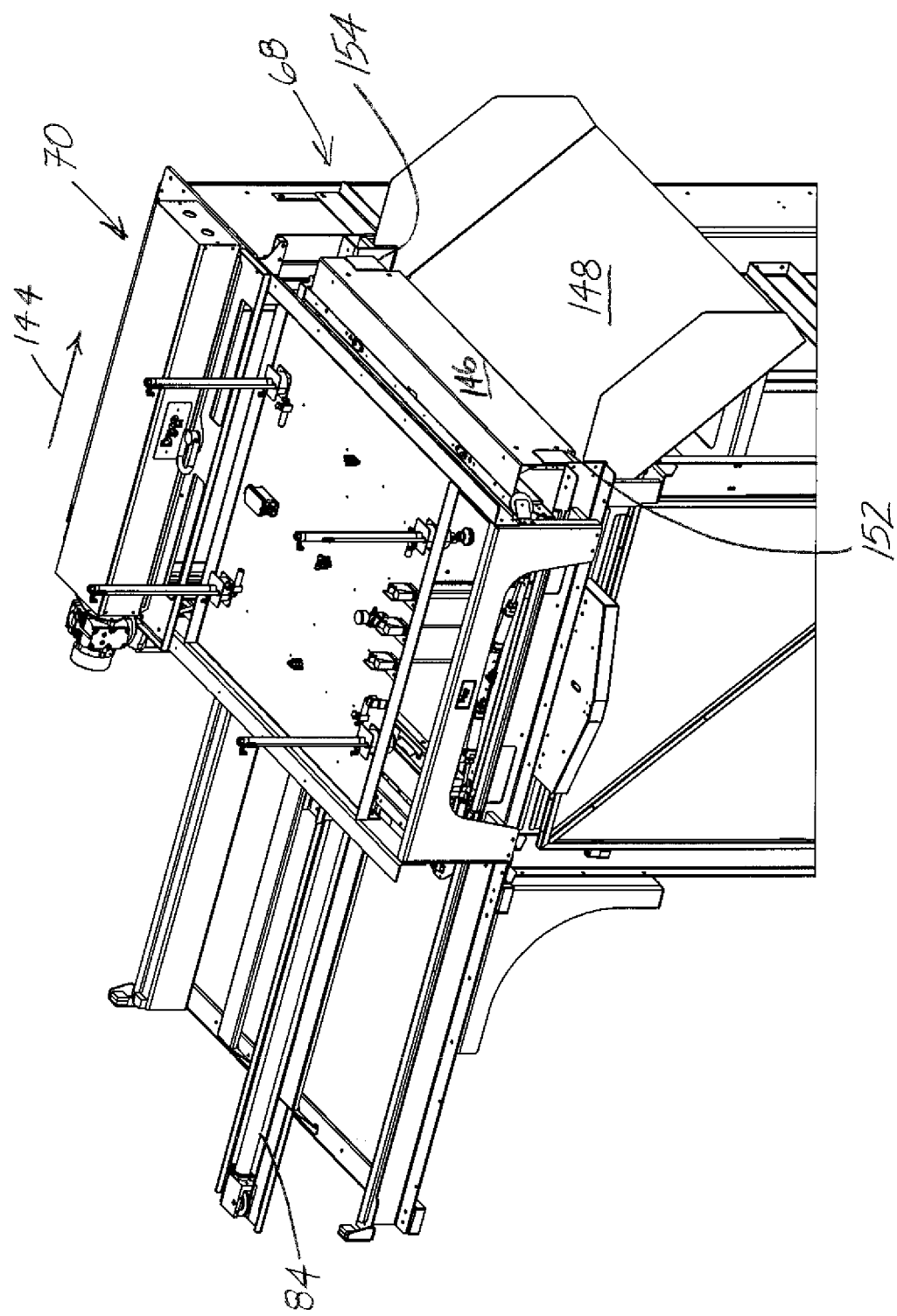
FIG. 12 is an upper perspective cutaway view of the depalletizing apparatus of FIG. 4 with the collector in the unloading zone.
Figure 13:
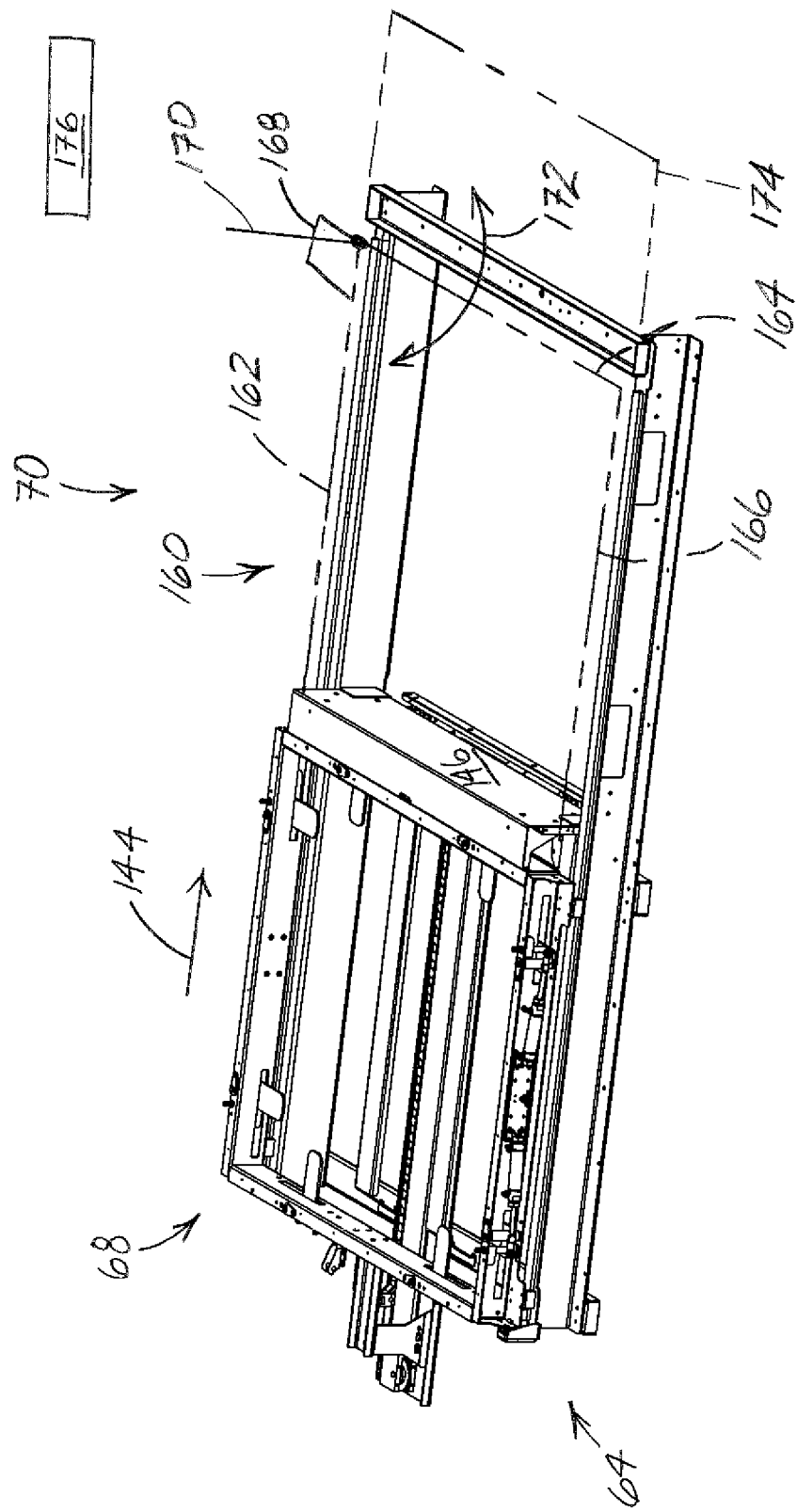
FIG. 13 is an upper perspective view of an exemplary collector.

For example, referring to FIG. 13, collector 68 includes interconnected support members 162, 164, 166 in combination with surface 146, defining a rectangular enclosure 160 adapted to surround a periphery of an article array, thereby stabilizingly supporting the article array. In one embodiment, support member 164 is movable relative to adjacent support members 162, 166 such as by a motor 168 urging one end of support member 164 into rotational movement about a vertical axis 170. Furthermore, instead of enclosure 160 of collector 68 moving an article array toward a chute 148 (FIG. 12), the article array could be directed toward a horizontal support surface 174 or collection area for a head or remover 176 such as may be attached to a robotic arm (not shown) to transport the stabilizingly supported article array from horizontal support surface 174 or collection area to another area for further processing. In this arrangement, horizontal support surface 174 or the collection area would still be considered as part of the unloading zone 70 of the depalletizing apparatus. However, irrespective of whether the article array is stabilizingly supported or not stabilizingly supported, once the article array is removed from the unloading zone, the underlying or supporting dunnage layer is now vertically exposed for subsequent removal by the depalletizing apparatus as will be discussed in further detail below.

Figure 14A:
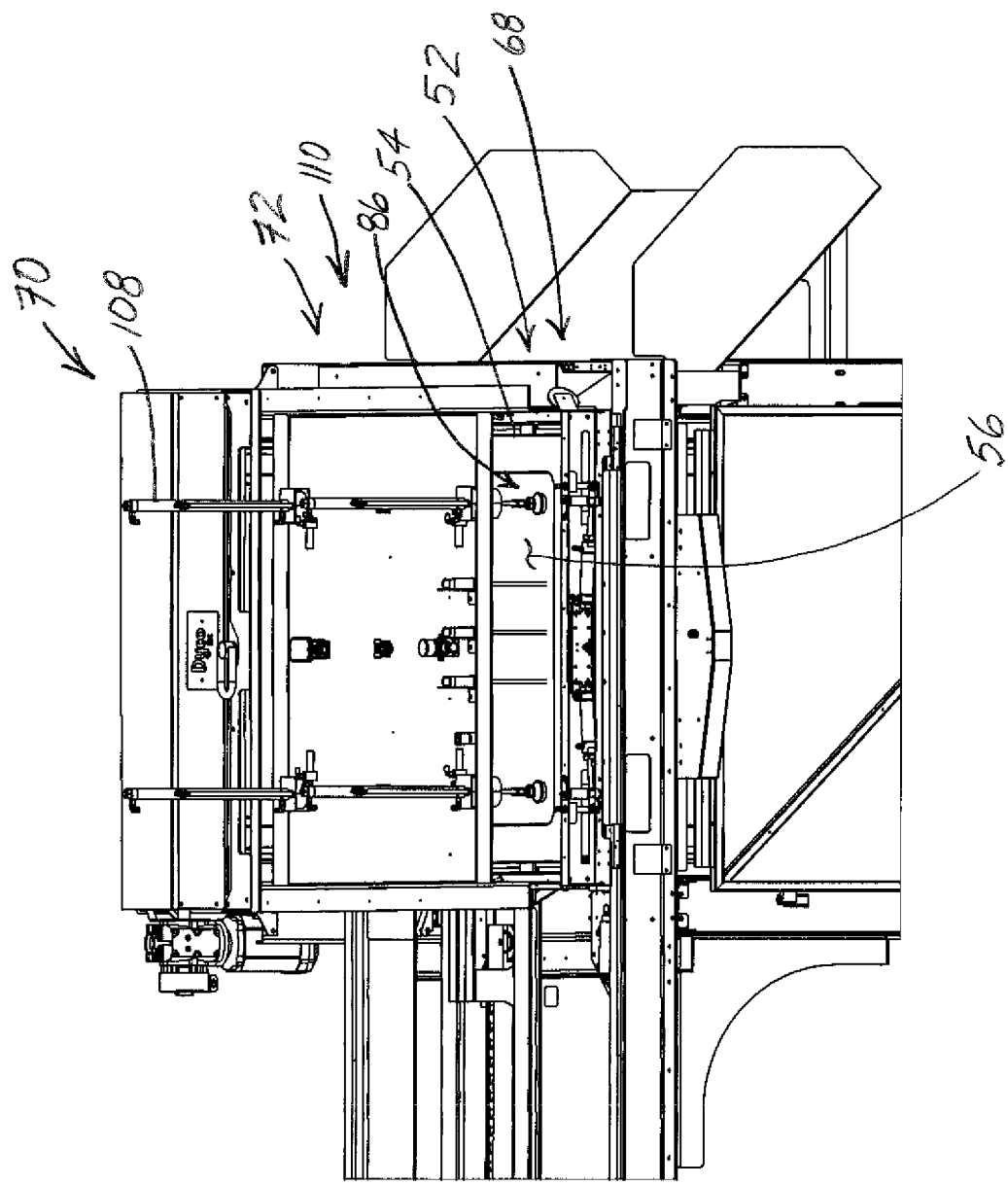
FIG. 14A is an enlarged, partial upper perspective view of the depalletizing apparatus of FIG. 4 with the collector in the unloading zone collecting a dunnage layer.
Figure 14B:
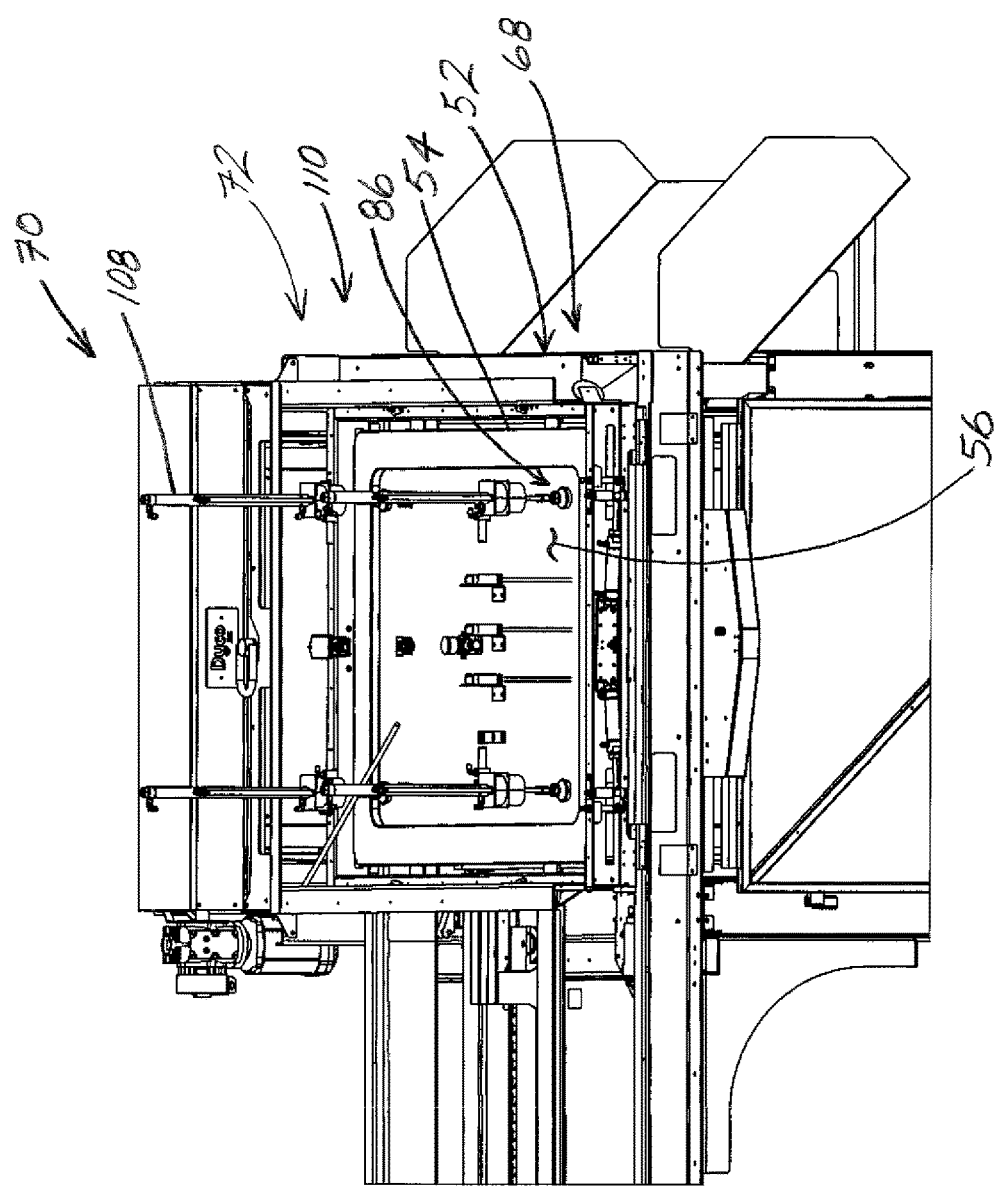
FIG. 14B is an enlarged, partial upper perspective cutaway view of the depalletizing apparatus of FIG. 14A with the collector in the unloading zone collecting a dunnage layer.

Referring to FIGS. 14A and 14B, (subsequent to removing the article array from unloading zone 70 as previously discussed in FIGS. 12 and 13; for example, removing top article array 58 (FIG. 3B)), top dunnage layer 52, which includes top frame 54 and top slip sheet 56, are collectively secured in retracted position 110 of remover 72. As a result of having removed top article array 58 from unloading zone 70, aperture 86 of collector 68 is positioned in unloading zone 70 vertically beneath remover 72. At this point, members 100 (FIG. 5) of collector 68 have been or are positioned by actuators 104 (FIG. 5) to define effective cross section 98 (FIG. 5), which is reduced from effective cross section 96 (FIG. 5). Pneumatic actuators 108 discontinue or disrupt the vacuum force securing top dunnage layer 52 to the ends of pneumatic actuators 108, resulting in top dunnage layer 52 to fall by force of gravity into aperture 86 of collector 68. Due to aperture 86 defining effective cross section 98 (FIG. 5) that is less than the effective cross section of top slip sheet 56 of top dunnage layer 52, top dunnage layer 52 contacts members 100 (FIG. 5), is prevented from falling through aperture 86, and is retained in aperture 86 of collector 68. In other words, top dunnage layer 52 is collected in aperture 86 of collector 68.

Figure 15:
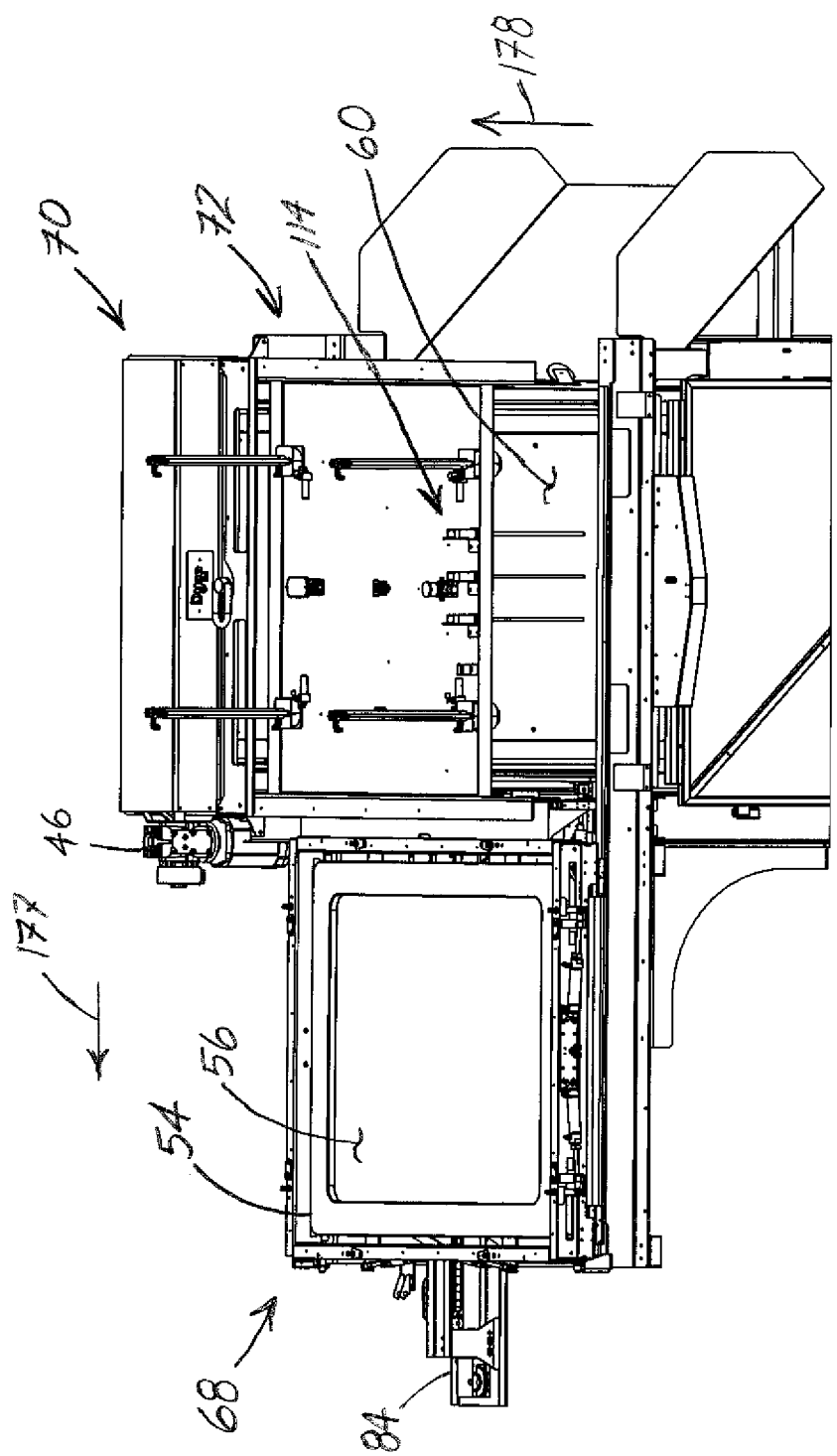
FIG. 15 is an upper perspective view of the depalletizing apparatus of FIG. 14A with the collector positioned outside of the unloading zone.

Referring to FIG. 15, (subsequent to top dunnage layer 52 being retained in aperture 86 of collector 68 (FIGS. 14A and 14B)) collector 68 is urged to move in direction 177 out of unloading zone 70 by movement source 84. Aligner 114 is activated to align next top dunnage layer 60 and next top article array 62 (FIG. 3B) with unloading zone 70, with motor 46 of lifting arrangement 36 (FIG. 2) urging the loaded pallet 12 (FIG. 3A) to move in direction 178 until aligned with unloading zone 70. After the alignment is achieved, next top dunnage layer 60 is removed by remover 72, vertically exposing next top array 62 (FIG. 3B), followed by removal of next top array 62 from unloading zone 70, followed by collecting next top dunnage layer 60 in aperture 86 (FIGS. 14A and 14B) of collector 68. This sequence is repeated until all article arrays have been removed and all dunnage layers have been collected in aperture 86 (FIGS. 14A and 14B) of collector 68.

Once all article arrays have been removed from the pallet, there may be a remaining dunnage layer overlying the otherwise empty pallet. For purposes herein, the term "empty pallet" and the like may include a pallet from which all article arrays have been removed, even if a dunnage layer remains overlying and supported directly by the pallet. Nonetheless, in one embodiment, the remover and the collector may be utilized to remove the remaining dunnage layer from the pallet in a manner previously discussed. Optionally, in one embodiment, instead of removing the remaining dunnage layer overlying the otherwise empty pallet, operation of the apparatus may proceed directly to FIG. 16 as is described in additional detail below.

Figure 16:
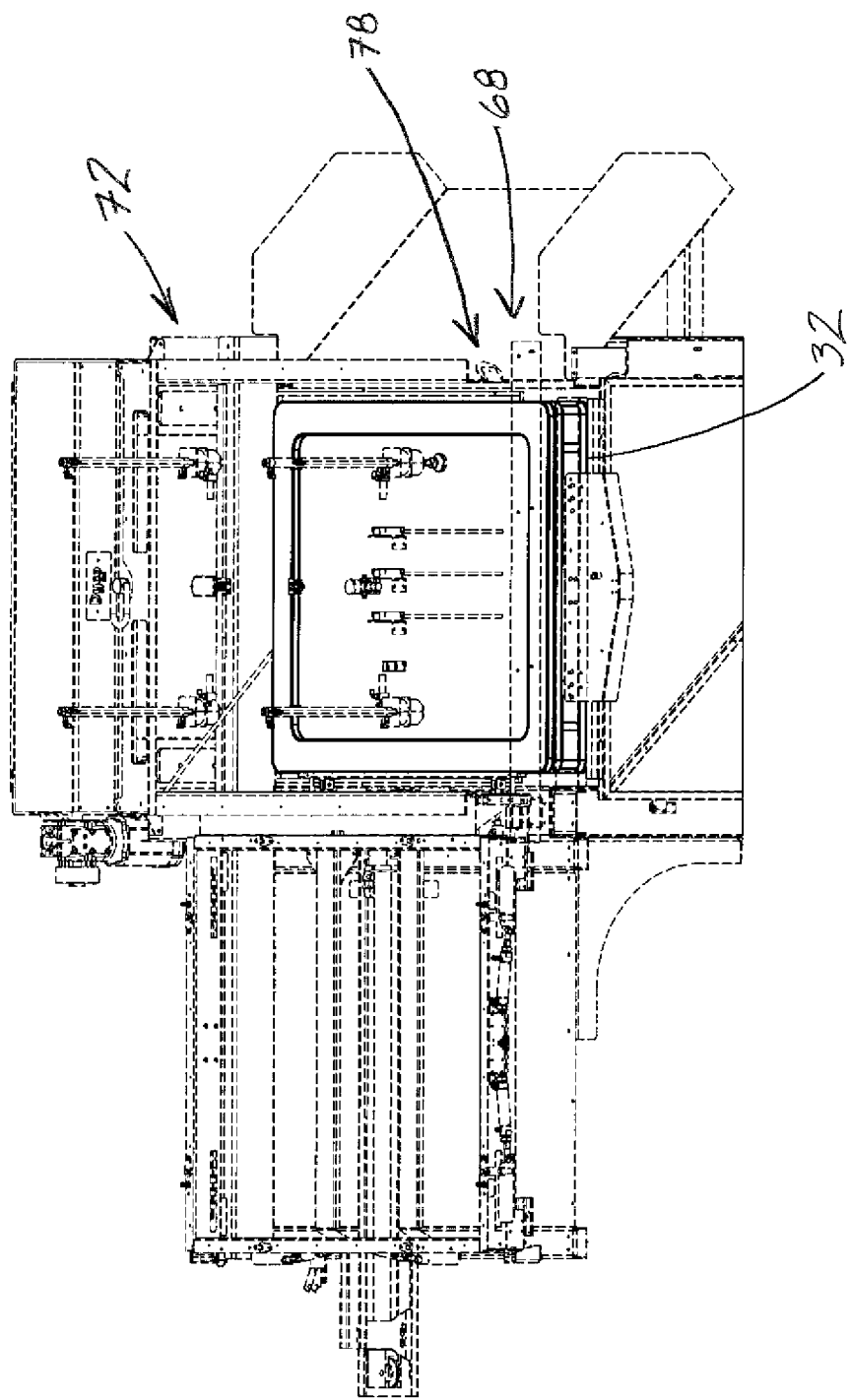
FIG. 16 is an upper perspective view of the depalletizing apparatus of FIG. 14A with the collector depositing collected dunnage layers onto an empty pallet in the unloading zone.

Referring to FIG. 16, subsequent to collecting all dunnage layers that have been collected in aperture 86 (FIGS. 14A and 14B) of collector 68, all collected dunnage layers 78 are deposited onto empty pallet 32.

Figure 17:
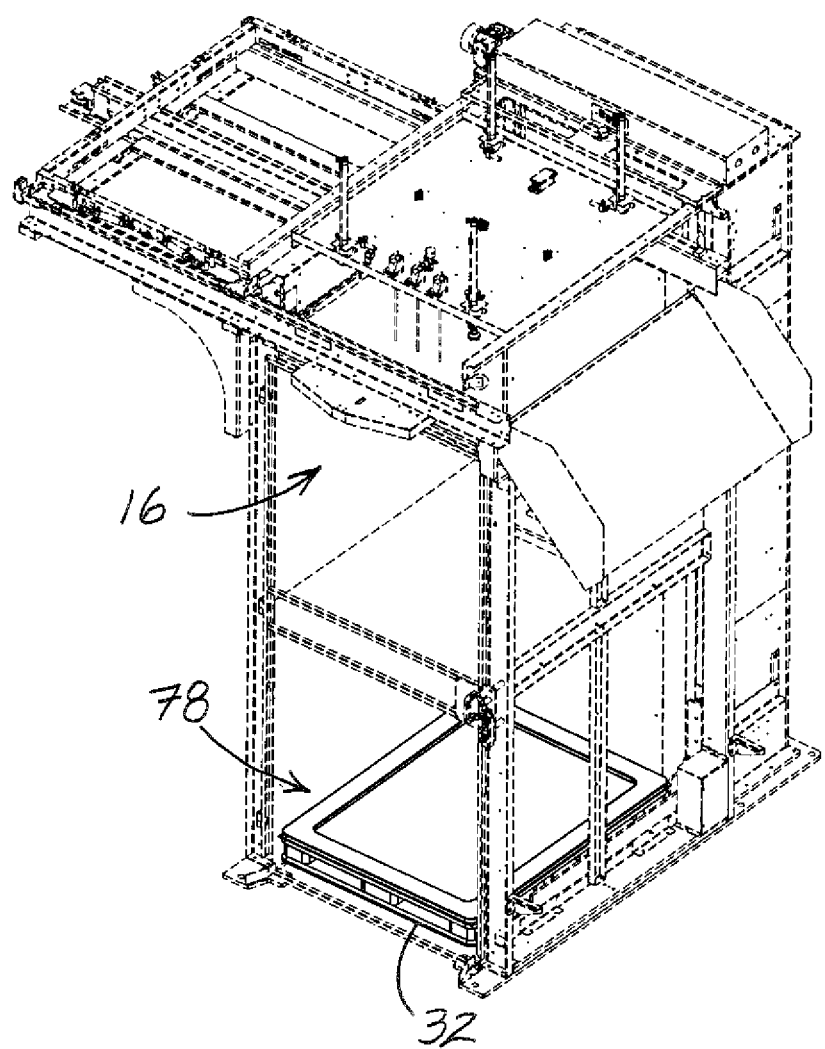
FIG. 17 is an upper perspective view of the depalletizing apparatus of FIG. 14A with the empty pallet and collected dunnage layers positioned outside of the unloading zone.

Referring to FIG. 17, the collected dunnage layers 78 and empty pallet 32 are returned to the bottom of chamber 16 for removal from the depalletizing apparatus, in preparation of loading a new loaded pallet 12 (FIG. 3A) in chamber 16 for depalletizing in a manner as previously discussed.

In one embodiment, a method of depalletizing a loaded pallet 12 with a depalletizing apparatus 10, the loaded pallet 12 comprised of (n) vertically stacked article arrays 14, each article array 14 separated from an adjacent article array 14 by a dunnage layer 52, 60, 74, the loaded pallet 12 including a top article array 58 vertically supporting a top dunnage layer 52, the method comprising:
  (a) loading the loaded pallet 12 into a chamber 16 of the depalletizing apparatus 10;
  (b) aligning the top article array 58 and the top dunnage layer 52 with an unloading zone 70 of the depalletizing apparatus 10;
  (c) removing the top dunnage layer 52 with the depalletizing apparatus 10, vertically exposing the top article array 58;
  (d) removing the top article array 58 with the depalletizing apparatus 10, vertically exposing a next top dunnage layer 60;
  (e) aligning a next top article array 62 and the next top dunnage layer 60 with the unloading zone 70 of the depalletizing apparatus 10;
  (f) removing the next top dunnage layer 60, vertically exposing the next top article array 62;
  (g) removing the next top article array 62;
  (h) repeating steps (e)-(g) until all article arrays 76 are removed, leaving an empty pallet 32; and
  (i) depositing the removed dunnage layers 78 on the empty pallet 32.

While exemplary embodiments of the depalletizing apparatus disclose raising a loaded pallet for removing article arrays, the present invention is not so limited. For example, the depalletizing apparatus may be constructed over a recess formed in a support surface, such, as an elevator shaft. In such an arrangement, the loaded pallet could be initially lowered until the top dunnage layer and the top article array are aligned for their removal, as previously discussed.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. An apparatus for depalletizing a loaded pallet comprised of (n) vertically stacked article arrays, each article array separated from an adjacent article array by a dunnage layer, the loaded pallet including a top article array vertically supporting a top dunnage layer, the apparatus comprising:
   a chamber for receiving the loaded pallet on a lifter movable inside of the chamber;
   an unloading zone;
   a sensor for determining when the top article array and the top dunnage layer are aligned in the unloading zone by the lifter;
   a first remover for removing vertically exposed dunnage layers;
   a collector for collecting the removed dunnage layers from the first remover and for removing article arrays from the unloading zone;
   wherein during operation of the apparatus, in response to the sensor determining when the top article array and the top dunnage layer are aligned in the unloading zone by the lifter, the top dunnage layer is removed by the first remover, the collector then moving into the unloading zone or a second remover moving into the unloading zone to remove the top article array, vertically exposing a next top dunnage layer, the top dunnage layer being collected in the collector in the unloading zone;
   wherein in response to the sensor determining when the next top article array and the next top dunnage layer are aligned in the unloading zone, the next top dunnage layer is removed by the first remover in the unloading zone, the collector then moving into the unloading zone or the second remover moving into the unloading zone to remove the next top article array, the next top dunnage layer being collected in the collector;
   wherein in response to any remaining article arrays and dunnage layers being sequentially removed from the unloading zone by at least one of the first remover, the second remover or the collector, leaving an empty pallet, the collector is adapted to deposit all collected dunnage layers onto the empty pallet on the lifter;
   wherein the lifter moves the collected dunnage layers and the empty pallet inside the chamber for permitting removal of the collected dunning layers and the empty pallet from the chamber.

2. The apparatus of claim 1, wherein the collector removes the article arrays from the unloading zone in a first direction.

3. The apparatus of claim 2, wherein the collector includes a surface for moving the article arrays from the unloading zone in the first direction.

4. The apparatus of claim 3, wherein the surface includes movable surface portions positioned at opposed ends of the surface.

5. The apparatus of claim 4, wherein during movement of the collector in the first direction, the movable surface portions are adapted to remain in an open position for a predetermined distance.

6. The apparatus of claim 2, wherein the collector includes an enclosure for stabilizingly supporting the article arrays while the arrays are being removed from the unloading zone in the first direction.

7. The apparatus of claim 2, wherein the collector includes an enclosure including a portion movable between a closed position for stabilizingly supporting the article arrays, and an open position for permitting the article arrays to be removed from the enclosure in the first direction.

8. The apparatus of claim 1, wherein the apparatus further comprises a retainer for retaining a corresponding dunnage layer in the unloading zone.

9. The apparatus of claim 8, wherein the retainer includes a first positioner for moving the corresponding dunnage layer a predetermined distance in the unloading zone in a first direction.

10. The apparatus of claim 9, wherein the retainer includes a second positioner for fixedly positioning the corresponding dunnage layer in the unloading zone.

11. The apparatus of claim 10, wherein the second positioner is movable in a second direction.

12. The apparatus of claim 10, wherein the second positioner applies a compressive force to the corresponding dunnage layer.

13. The apparatus of claim 1, wherein the collector includes an inner periphery defining a selectably adjustable aperture having a first effective cross section and a second effective cross section, the first effective cross section being sized to permit dunnage layers to fall through the inner periphery by force of gravity, the second effective cross section being sized to prevent dunnage layers to fall through the inner periphery by force of gravity.

14. The apparatus of claim 1, wherein the collector including at least one member at least partially movable relative to the inner periphery for adjusting a size of the aperture between the first effective cross section and the second effective cross section.

15. An apparatus for depalletizing a loaded pallet comprised of (n) vertically stacked article arrays, each article array separated from an adjacent article array by a dunnage layer, the loaded pallet including a top article array vertically supporting a top dunnage layer, the apparatus comprising:
   a chamber for receiving the loaded pallet on a lifter movable inside of the chamber;
   an unloading zone;
   a sensor for determining when the top article array and the top dunnage layer are aligned in the unloading zone by the lifter;
   a first remover for removing vertically exposed dunnage layers;

a collector for collecting the removed dunnage layers from the first remover and for removing article arrays from the unloading zone;

wherein during operation of the apparatus, in response to the sensor determining when the top article array and the top dunnage layer are aligned in the unloading zone by the lifter, the top dunnage layer is removed by the first remover, the collector then moving into the unloading zone or a second remover moving into the unloading zone to remove the top article array, vertically exposing a next top dunnage layer, the top dunnage layer being collected in the collector in the unloading zone;

wherein in response to the sensor determining when the next top article array and the next top dunnage layer are aligned in the unloading zone by the lifter, the next top dunnage layer is removed by the first remover in the unloading zone, the collector then moving into the unloading zone or the second remover moving into the unloading zone to remove the next top article array, the next top dunnage layer being collected in the collector;

wherein in response to any remaining article arrays and dunnage layers being sequentially removed from the unloading zone by at least one of the first remover, the second remover or the collector, leaving an empty pallet, the collector is adapted to deposit all collected dunnage layers onto the empty pallet on the lifter;

wherein the lifter moves the collected dunnage layers and the empty pallet inside the chamber for permitting removal of the collected dunning layers and the empty pallet from the chamber;

wherein the collector including an enclosure for stabilizingly supporting the article arrays while the arrays are being removed from the unloading zone in the first direction;

wherein the enclosure including a portion movable between a closed position for stabilizingly supporting the article arrays, and an open position for permitting the article arrays to be removed from the enclosure in the first direction.

16. A method of depalletizing a loaded pallet with a depalletizing apparatus, the loaded pallet comprised of (n) vertically stacked article arrays, each article array separated from an adjacent article array by a dunnage layer, the loaded pallet including a top article array vertically supporting a top dunnage layer, the method comprising:
  (a) loading the loaded pallet into a chamber of the depalletizing apparatus;
  (b) aligning the top article array and the top dunnage layer in an unloading zone of the depalletizing apparatus;
  (c) removing the top dunnage layer with the depalletizing apparatus, vertically exposing the top article array;
  (d) removing the top article array with the depalletizing apparatus, vertically exposing a next top dunnage layer;
  (e) aligning a next top article array and the next top dunnage layer in the unloading zone of the depalletizing apparatus;
  (f) removing the next top dunnage layer, vertically exposing the next top remaining article array;
  (g) removing the next top article array;
  (h) repeating steps (e)-(g) until all article arrays are removed, leaving an empty pallet; and
  (i) depositing the removed dunnage layers on the empty pallet in the chamber.

17. The method of claim 16, wherein (d) removing the top article array includes the depalletizing apparatus stabilizingly supporting the top article array during removal.

18. The method of claim 16, wherein (d) removing the top article array includes the depalletizing apparatus not supporting a periphery of the top article array during removal.

19. The method of claim 16 further comprises subsequent to (i) depositing the removed dunnage layers on the empty pallet,
  removing the removed dunnage layers and empty pallet from the chamber of the depalletizing apparatus.

20. The method of claim 19 further comprises subsequent to (j) removing the removed dunnage layers and empty pallet from the chamber of the depalletizing apparatus,
  (k) loading another loaded pallet in the chamber of the depalletizing apparatus.

* * * * *